United States Patent
Yoshizawa et al.

(10) Patent No.: US 12,423,542 B2
(45) Date of Patent: Sep. 23, 2025

(54) IMAGE PROCESSING APPARATUS, IMAGE PROCESSING METHOD, PRINTING APPARATUS, AND STORAGE MEDIUM

(71) Applicant: CANON KABUSHIKI KAISHA, Tokyo (JP)

(72) Inventors: Kei Yoshizawa, Kanagawa (JP); Yosuke Ishii, Kanagawa (JP); Tatsuo Shimmoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 17/972,654

(22) Filed: Oct. 25, 2022

(65) Prior Publication Data
US 2023/0142347 A1    May 11, 2023

(30) Foreign Application Priority Data
Nov. 9, 2021  (JP) .................................. 2021-182861

(51) Int. Cl.
| | | |
|---|---|---|
| G06K 15/10 | (2006.01) | |
| B41J 2/21 | (2006.01) | |
| G06K 15/02 | (2006.01) | |

(52) U.S. Cl.
CPC .......... *G06K 15/107* (2013.01); *B41J 2/2107* (2013.01); *B41J 2/2114* (2013.01); *G06K 15/1809* (2013.01)

(58) Field of Classification Search
CPC .... B41J 2/2114; B41J 2/2107; B41J 11/0015; B41J 11/002; B41J 29/38; G06K 15/107; G06K 15/1809
See application file for complete search history.

(56) References Cited

U.S. PATENT DOCUMENTS

| | | | |
|---|---|---|---|
| 8,870,339 B2 | 10/2014 | Tojo et al. | |
| 2012/0062636 A1* | 3/2012 | Yamamoto | G06K 15/107 347/15 |
| 2016/0303872 A1* | 10/2016 | Okuda | B41M 5/0017 |
| 2021/0354476 A1* | 11/2021 | Niizuma | B41J 11/0015 |

FOREIGN PATENT DOCUMENTS

JP    2011-173330 A    9/2011

* cited by examiner

*Primary Examiner* — Jannelle M Lebron
(74) *Attorney, Agent, or Firm* — Venable LLP

(57) ABSTRACT

A generation unit, which is configured to process image data to generate print data for applying an ink and a reaction liquid such that the print data corresponds to respective passes, generates print data for the ink such that the ink is applied only in a pass of which the elapsed time after application of the reaction liquid to the print medium is equal to or longer than the first time and shorter than the second time. The first time is from the timing where the reaction liquid is applied to the print medium up to the timing where adjacent droplets of the applied reaction liquid come into contact with each other and coalesce to form a reaction liquid film. The second time is from the timing where the reaction liquid is applied to the print medium up to the timing where the formed reaction liquid film is dissolved.

12 Claims, 21 Drawing Sheets

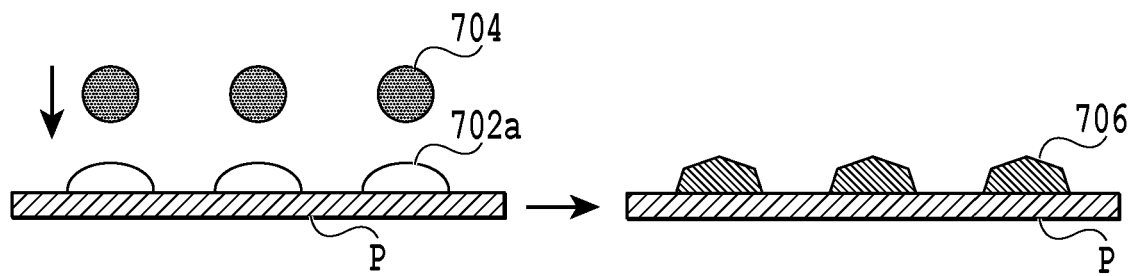
FIG.7A
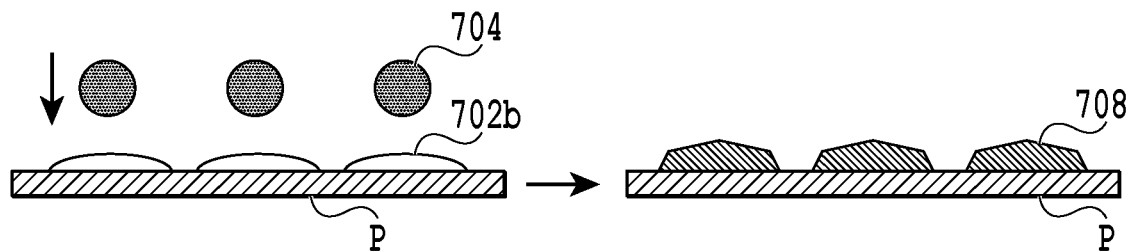
FIG.7B
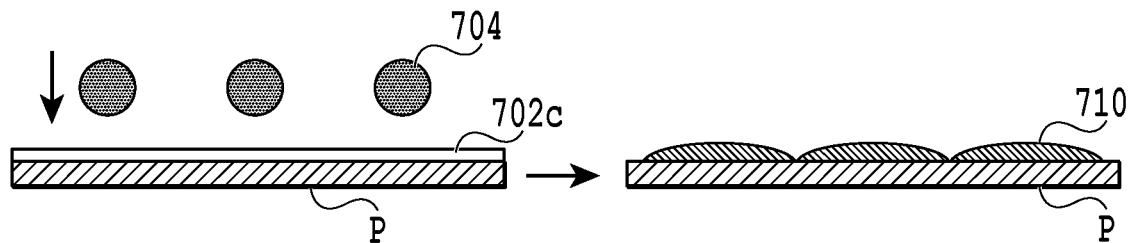
FIG.7C
| WETTING AND SPREADING OF REACTION LIQUID | HEIGHT OF INK DOT | GLOSS IMAGE CLARITY |
|---|---|---|
| LOW (THE STATE OF Fig. 7A) | HIGH | LOW |
| MIDDLE (THE STATE OF Fig. 7B) | MIDDLE | MIDDLE |
| HIGH (THE STATE OF Fig. 7C) | LOW | HIGH |
FIG.7D

FIG.9

| INK APPLICATION AMOUNT Id[%] | Id < 40% | 40% ≤ Id < 125% | 125% ≤ Id |
|---|---|---|---|
| UNIT MASK PATTERN FOR INKS | MASK PATTERN CB (FOR LOW/HIGH DENSITY TONE) | MASK PATTERN CA (FOR INTERMEDIATE DENSITY TONE) | MASK PATTERN CB (FOR LOW/HIGH DENSITY TONE) |
| UNIT MASK PATTERN FOR REACTION LIQUID | MASK PATTERN RA | MASK PATTERN RA | MASK PATTERN RA |

| n-th PASS | ELAPSED TIME BASED ON THE FIRST PASS |
|---|---|
| 1 | 0sec |
| 2 | 1.4sec |
| 3 | 2.8sec |
| 4 | 4.2sec |
| 5 | 5.6sec |
| 6 | 7.0sec |
| 7 | 8.4sec |
| 8 | 09.8sec |

FIG.15C MASK PATTERN RA (RA1–RA8)

FIG.15D MASK PATTERN CA (CA1–CA8)

FIG.15E MASK PATTERN CB (CB1–CB8)

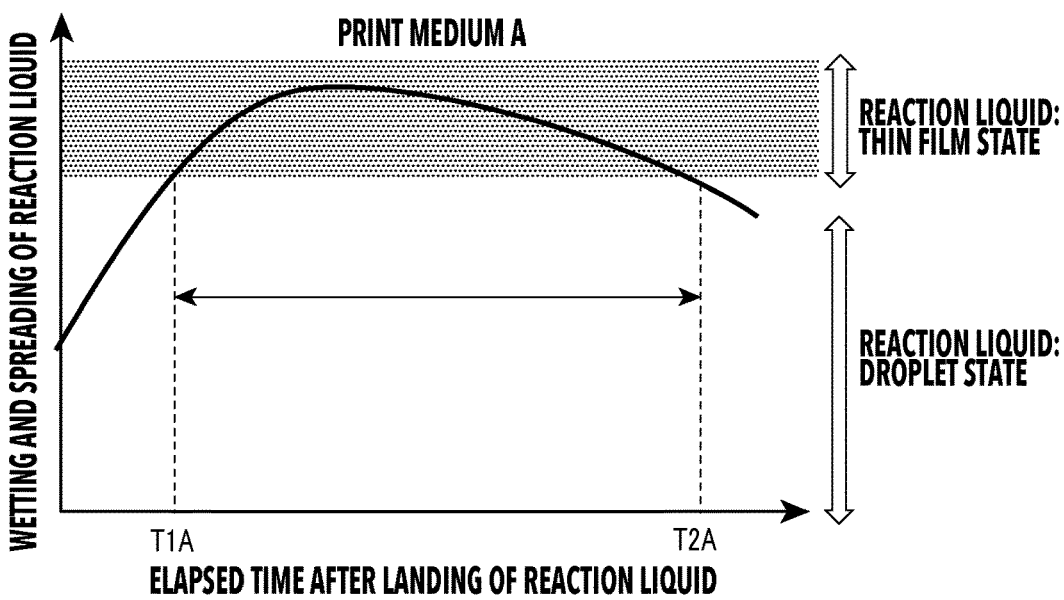
FIG.16A
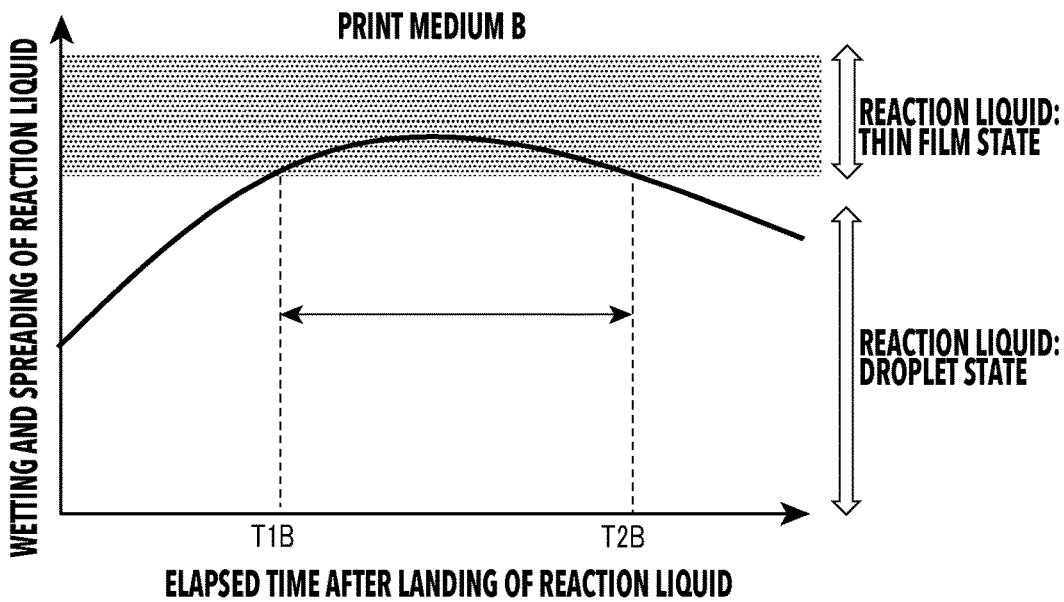
FIG.16B
| TYPE OF PRINT MEDIUM | FORMATION TIME T1 | DISSOLUTION TIME T2 |
|---|---|---|
| PRINT MEDIUM A | 2.4sec | 8.0sec |
| PRINT MEDIUM B | 4.6sec | 7.4sec |
FIG.16C

| n-th PASS | ELAPSED TIME BASED ON THE FIRST PASS | MASK PATTERN RA | MASK PATTERN CC | MASK PATTERN CB |
|---|---|---|---|---|
| 1 | 0sec | | | |
| 2 | 1.4sec | | | |
| 3 | 2.8sec | | | |
| 4 | 4.2sec | | | |
| 5 | 5.6sec | | | |
| 6 | 7.0sec | | | |
| 7 | 8.4sec | | | |
| 8 | 9.8sec | | | |

FIG.17

| TYPE OF PRINT MEDIUM | INK APPLICATION AMOUNT Id[%] | Id < 40% | 40% ≤ Id < 125% | 125% ≤ Id |
|---|---|---|---|---|
| PRINT MEDIA A | UNIT MASK PATTERN FOR INKS | MASK PATTERN CB (FOR LOW/HIGH DENSITY TONE) | MASK PATTERN CA (FOR INTERMEDIATE DENSITY TONE) | MASK PATTERN CB (FOR LOW/HIGH DENSITY TONE) |
| | UNIT MASK PATTERN FOR REACTION LIQUID | MASK PATTERN RA | MASK PATTERN RA | MASK PATTERN RA |
| PRINT MEDIA B | UNIT MASK PATTERN FOR INKS | MASK PATTERN CB (FOR LOW/HIGH DENSITY TONE) | MASK PATTERN CC (FOR INTERMEDIATE DENSITY TONE) | MASK PATTERN CB (FOR LOW/HIGH DENSITY TONE) |
| | UNIT MASK PATTERN FOR REACTION LIQUID | MASK PATTERN RA | MASK PATTERN RA | MASK PATTERN RA |

FIG.19

IMAGE PROCESSING APPARATUS, IMAGE PROCESSING METHOD, PRINTING APPARATUS, AND STORAGE MEDIUM

BACKGROUND OF THE INVENTION

Field of the Invention

The present invention relates to an image processing apparatus, an image processing method, a printing apparatus including the image processing apparatus, and a storage medium for generating print data to be used in a printing apparatus capable of printing using an ink and a reaction liquid that reacts with the ink.

Description of the Related Art

In a case where printing is performed on a print medium with low ink permeability by a printing apparatus that performs printing in an inkjet scheme, the ink applied to the print medium does not readily permeate the print medium, and thus bleeding and beading of the ink tend to occur. In order to suppress such a phenomenon, there has been a proposal of a technology for thickening the ink on the print medium. In Japanese Patent Laid-Open No. 2011-173330, there is disclosed a technology for thickening ink by applying an ink including a solid content such as a coloring material after applying a reaction liquid in order to cause the ink and the reaction liquid to react with each other on the print medium so that the solid content aggregates.

However, in the technology disclosed in Japanese Patent Laid-Open No. 2011-173330, since the applied ink droplets are thickened due to the reaction with the reaction liquid, there is an increase in the height and surficial asperity of dots formed of the ink droplets formed on the print medium, and thus the variation in the direction of light reflection increases. For this reason, compared to the case where a reaction liquid is not applied, there has been a reduction in the gloss image clarity of a printed image.

SUMMARY OF THE INVENTION

The present invention has been made in view of the above-described problem and provides a technology capable of suppressing a reduction in the gloss image clarity of a printed image in printing using an ink and a reaction liquid.

In the first aspect of the present invention, there is provided an image processing apparatus including:
an obtainment unit configured to obtain image data; and
a generation unit configured to process the image data to generate print data for applying an ink and a reaction liquid that prompts thickening of the ink to a print medium such that the print data corresponds to respective passes of multi-pass printing,
wherein the generation unit generates print data for the ink such that the ink is applied only in a pass of which an elapsed time after application of the reaction liquid to the print medium is equal to or longer than a first time and shorter than a second time, the first time being from a timing where the reaction liquid is applied to the print medium up to a timing where adjacent droplets of the applied reaction liquid come into contact with each other and coalesce to form a reaction liquid film, the second time being from the timing where the reaction liquid is applied to the print medium up to a timing where the formed reaction liquid film is dissolved.

In the second aspect of the present invention, there is provided an image processing method for processing image data,
wherein, as print data for an ink corresponding to respective passes of multi-pass printing, the print data is generated such that the ink is applied only in a pass of which an elapsed time after application of a reaction liquid that prompts thickening of the ink to the print medium is equal to or longer than a first time and shorter than a second time, the first time being up to a timing where adjacent droplets of the applied reaction liquid come into contact with each other and coalesce to form a reaction liquid film, the second time being up to a timing where the formed reaction liquid film is dissolved.

In the third aspect of the present invention, there is provided a non-transitory computer readable storage medium storing a program for causing a computer to function as an image processing apparatus, the image processing apparatus including:
an obtainment unit configured to obtain image data; and
a generation unit configured to process the image data to generate print data for applying an ink and a reaction liquid that prompts thickening of the ink to a print medium such that the print data corresponds to respective passes of multi-pass printing,
wherein the generation unit generates the print data for the ink such that the ink is applied only in a pass of which an elapsed time after application of the reaction liquid to the print medium is equal to or longer than a first time and shorter than a second time, the first time being from a timing where the reaction liquid is applied to the print medium up to a timing where adjacent droplets of the applied reaction liquid come into contact with each other and coalesce to form a reaction liquid film, the second time being from the timing where the reaction liquid is applied to the print medium up to a timing where the formed reaction liquid film is dissolved.

In the fourth aspect of the present invention, there is provided a printing apparatus including:
a printing unit configured to perform printing by applying an ink and a reaction liquid that prompts thickening of the ink; and
a control unit configured to control the printing unit to perform printing, based on image data corresponding to a unit area of a print medium, by applying the ink and the reaction liquid while performing scanning a plurality of times to the unit area,
wherein, in a case where the image data has predetermined density, the control unit controls the ink to be applied in a timing of a first time or later and earlier than a second time after the reaction liquid is applied, the first time being up to a point in time where adjacent droplets of the applied reaction liquid come into contact with each other and coalesce to form a reaction liquid film, the second time being up to a point in time where the formed reaction liquid film is dissolved.

According to the present invention, it is possible to suppress a reduction in the gloss image clarity of a printed image in printing using an ink and a reaction liquid.

Further features of the present invention will become apparent from the following description of exemplary embodiments with reference to the attached drawings.

BRIEF DESCRIPTION OF THE DRAWINGS

FIG. 7A to FIG. 7D are diagrams for explaining dot shapes and gloss image clarity according to the degree of wetting and spreading of a reaction liquid;

FIG. 9 is a diagram illustrating unit mask patterns for inks and reaction liquid corresponding to a predetermined print medium;

FIG. 13 is a diagram illustrating a threshold value table in the present embodiment;

FIG. 15A to FIG. 15E are diagrams illustrating mask patterns of a partial area including a predetermined area;

FIG. 16A to FIG. 16C are diagrams for explaining the wetting and spreading characteristics of the reaction liquid according to the type of print medium;

FIG. 17 is a diagram illustrating unit mask patterns for the inks and reaction liquid corresponding to another print medium;

FIG. 19 is a diagram illustrating a threshold value table in another embodiment.

DESCRIPTION OF THE EMBODIMENTS

Hereinafter, with reference to the accompanying drawings, a detailed explanation will be given of examples of an embodiment of an image processing apparatus, an image processing method, a printing apparatus, and a storage medium. Note that it is not intended that the following embodiments limit the present invention, and every combination of the characteristics explained in the present embodiments is not necessarily essential to the solution in the present invention. Further, the relative positions, shapes, etc., of the configurations described in the embodiments are merely examples and are not intended to limit this invention to the range of the examples.

First Embodiment

First, with reference to FIG. 1A to FIG. 15E, an explanation will be given of a printing apparatus including the image processing apparatus according to the first embodiment. The printing apparatus is what is termed as an inkjet printing apparatus of a serial-scan type, which ejects ink to a conveyed print medium in an inkjet scheme while moving in a direction intersecting the conveyance direction (orthogonally in the present embodiment).

<Configuration of the Printing Apparatus>

Figure 1A:
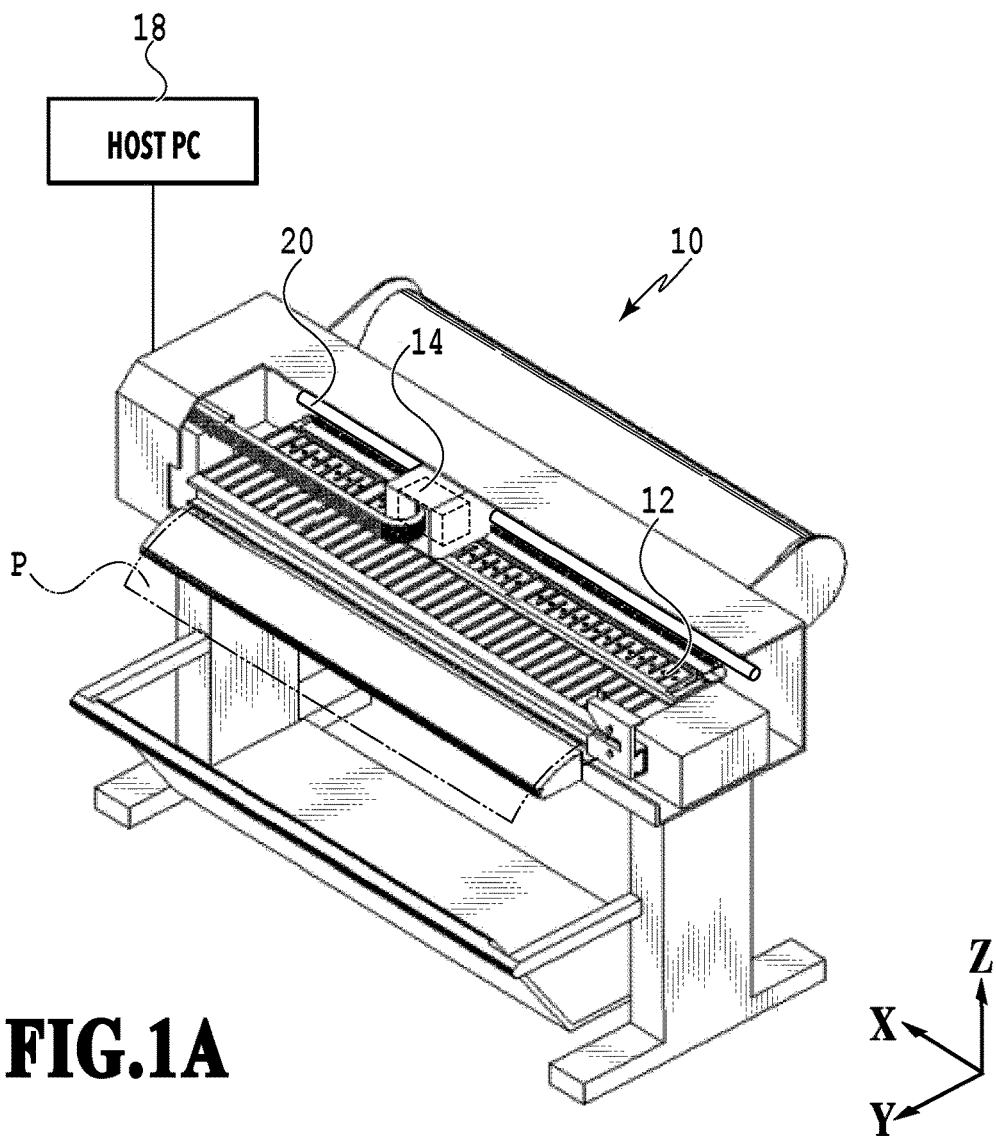
FIG. 1A and FIG. 1B are schematic configuration diagrams of a printing apparatus according to an embodiment.
Figure 1B:
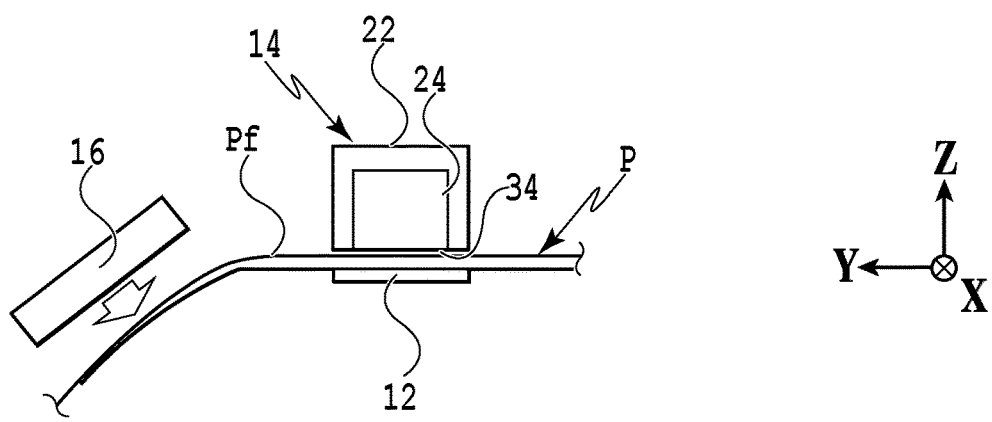

FIG. 1A is a schematic configuration diagram of a printing apparatus including an image processing apparatus according to the present embodiment. FIG. 1B is a diagram illustrating a printing part and a heat application part. The printing apparatus 10 includes the platen 12, which supports the print medium P conveyed by a conveyance part (not illustrated in the drawings), and the printing part 14, which performs printing by applying ink in an inkjet scheme to the print medium P that is supported by the platen 12. Further, the printing apparatus 10 includes the heat application part 16, which applies heat to the printing surface Pf of the print medium P after printing. Note that the entire operation of the printing apparatus 10 is controlled by the later-described control part 400. Further, the host computer (host PC) 18 is connected to the printing apparatus 10.

The printing part 14 includes the carriage 22, which is installed on the guide shaft 20 in a movable manner, and the print head 24, which is mounted on the carriage 22 to apply (eject) ink to the print medium P that is supported by the platen 12 in an inkjet scheme. The guide shaft 20 extends in the X direction which intersects (orthogonally in the present embodiment) the Y direction in which the print medium P is conveyed, and the carriage 22 is configured to be movable in the +X direction and the −X direction in a reciprocating manner along the guide shaft 20. The print head 24 includes the multiple ejection ports 202 (see FIG. 2) for ejecting ink, and the ejection port surface 34 on which the ejection ports 202 are formed is mounted on the carriage 22 so as to face the platen 12. Accordingly, in the printing apparatus 10, the print head 24 is configured to be capable of ejecting ink while reciprocating in the ±X direction.

Note that the printing apparatus 10 is equipped with the linear encoder 412 (see FIG. 4), so that the position of the print head 24 in the X direction is controlled based on signals of this linear encoder 412. Further, the print head 24 is configured to be capable of ejecting inks of four colors and the reaction liquid Ret that reacts with these inks so that the solid contents thereof aggregate. In the present embodiment, it is assumed that the inks of four colors are black (K) ink, cyan (C) ink, magenta (M) ink, and yellow (Y) ink. Note that the inks used in the printing apparatus 10 are not limited to the four colors of ink described above, and the number of inks is not limited to four colors.

The printing apparatus 10 performs printing in what is termed as a bidirectional printing scheme in which the printing part 14, i.e., the print head 24, ejects ink for printing at the time of moving in the +X direction and also ejects ink for printing at the time of moving in the −X direction. Alternatively, printing may be performed by what is termed as a unidirectional printing scheme in which ink is ejected at the time of moving in the +X direction (or −X direction). In printing in a bidirectional printing scheme, if a printing instruction is input by the host PC 18 so that printing is started, the printing apparatus 10 moves the print head 24 to the printing start position and conveys the print medium P with the conveyance part to a position where printing can be performed with the print head 24. Next, based on print data, a printing operation of ejecting ink while moving (scanning with) the print head 24 in the +X direction (or −X direction) is performed, and, if the printing operation is completed, a conveyance operation of conveying the print medium P by a predetermined amount with the conveyance part is performed. Thereafter, a printing operation of ejecting ink while moving the print head 24 in the −X direction (or +X direction) is performed, and, if the printing operation is completed, a conveyance operation of conveying the print medium P by the above-mentioned predetermined amount again with the conveyance part is performed. In this way, the printing apparatus 10 performs printing on the print medium P by alternately and repeatedly executing the printing operation and the conveyance operation. Note that, it is assumed that, in the present embodiment, what is termed as multipass printing, in which printing is performed by performing scanning on a unit area of a print medium multiple times together with printing with the print head 24, is executed.

The heat application part 16 blows warm air to the printing surface Pf of the print medium P to which inks (and the reaction liquid) have been ejected from the printing part 14 for printing, in order to apply heat to the printing surface Pf and the inks applied to the printing surface Pf so as to fix the inks to the printing surface Pf. The heating temperature is, for example, 100° C.

<Configuration of the Print Head>

Figure 2:
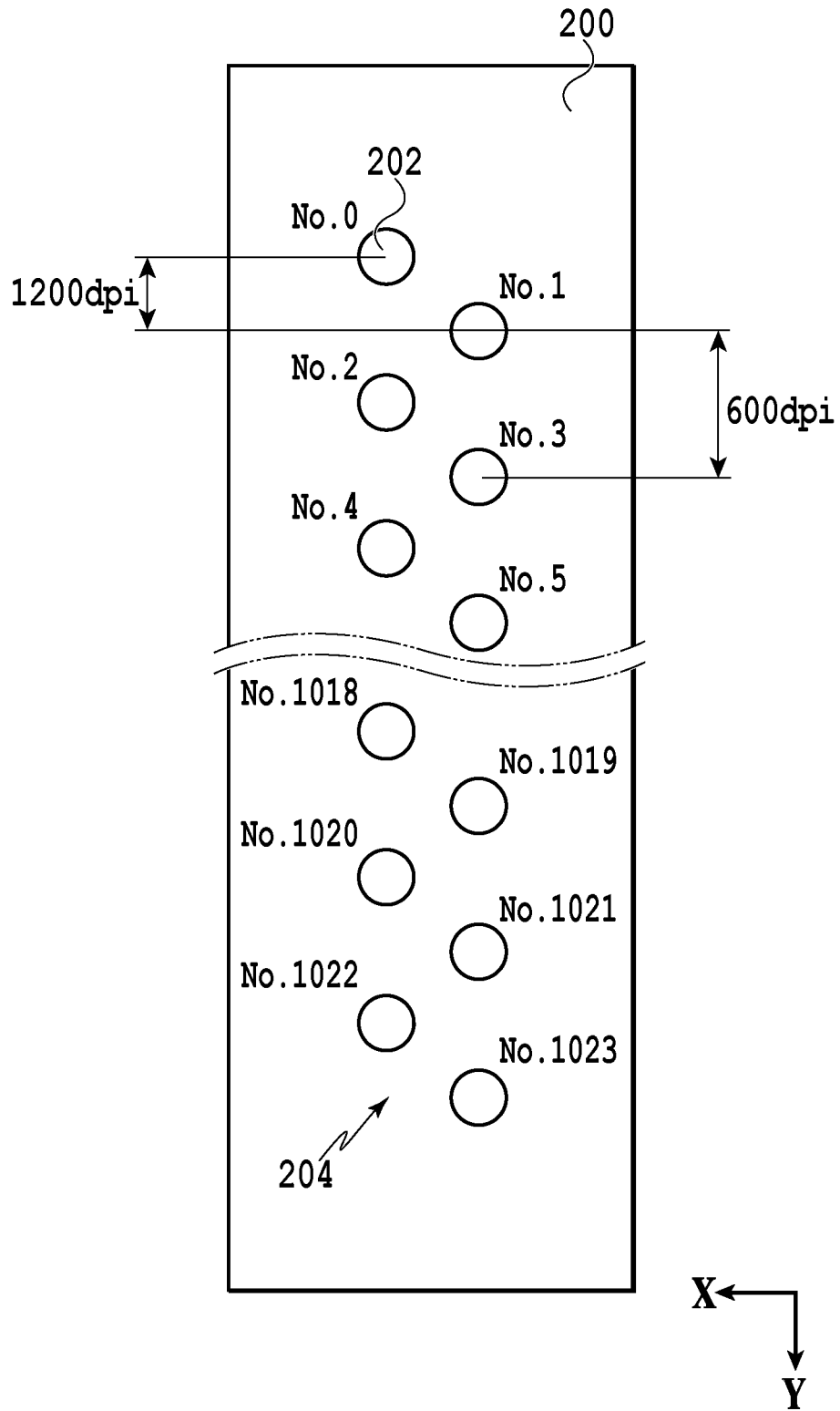
FIG. 2 is a diagram illustrating a base plate equipped with an ejection port array.
Figure 3:
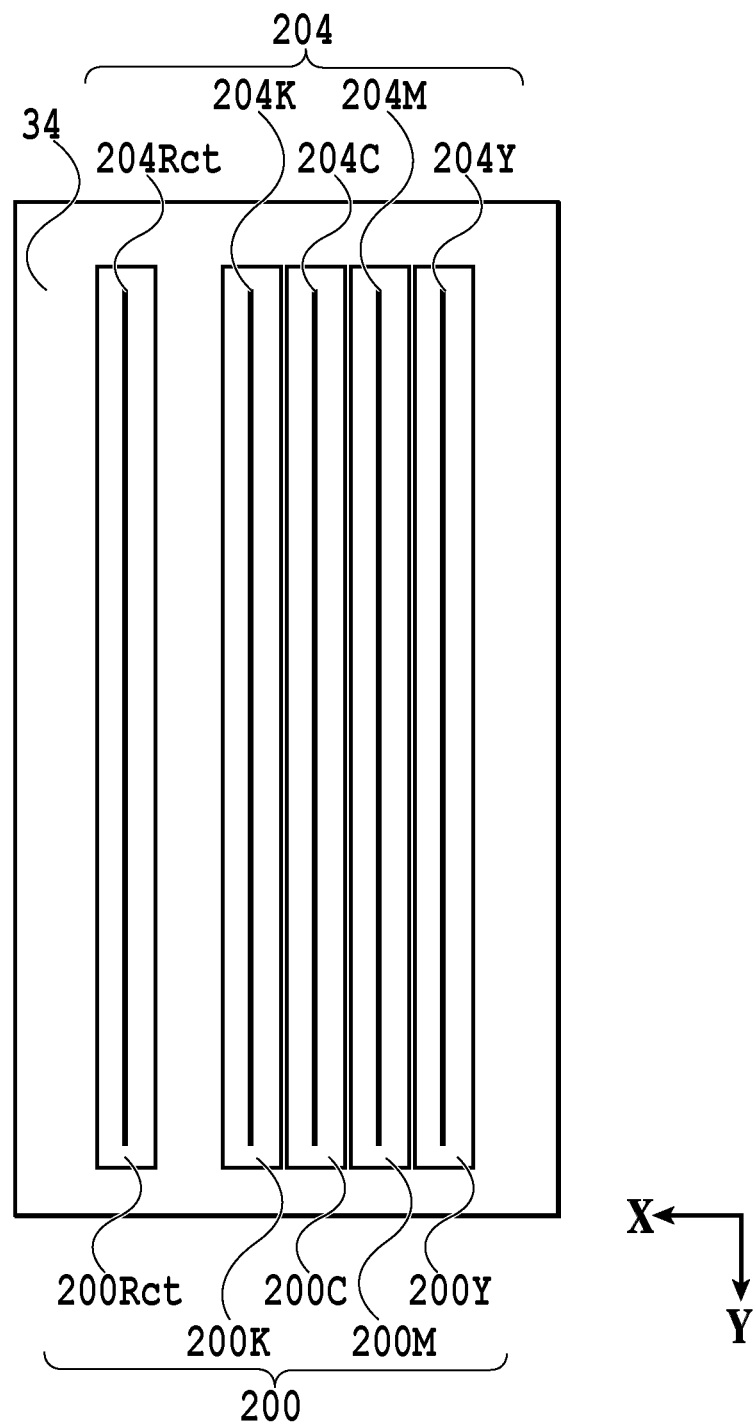
FIG. 3 is a diagram illustrating base plates arranged on an ejection port surface of a print head.

Next, the configuration of the print head 24 will be explained. On the ejection port surface 34 of the print head 24, base plates on which multiple ejection port arrays for ejecting the inks of the respective colors and the reaction liquid are formed are arranged. FIG. 2 is a diagram illustrating a base plate on which ejection port arrays of multiple ejection ports are formed. FIG. 3 is a diagram illustrating base plates arranged on the ejection port surface. FIG. 2 and FIG. 3 are diagrams seen from the ejection port surface 34 side.

On the base plate 200, the two arrays of ejection ports 202 for ejecting ink (or the reaction liquid) as droplets by driving print elements (not illustrated in the drawings) are formed along the Y direction at intervals of 600 dpi (density of 600 dots per inch) (see FIG. 2). These two arrays are formed such that, relative to one array, the other array is shifted by 1200 dpi in the Y direction. In the present embodiment, it is assumed that the ejection port array 204 is formed with the two arrays formed with 1024 ejection ports 202 on the base plate 200. Ink of corresponding one color or the reaction liquid is ejected from this ejection port array 204. Further, in the present embodiment, the droplet ejected from each ejection port 202 is 4 ng, and the droplets can be ejected at an ejection frequency of 21 kHz at a maximum.

On the ejection port surface 34, the base plates 200 corresponding to the inks of the respective colors and the reaction liquid are installed such that the ejection port arrays 204 are parallel to the Y direction (see FIG. 3) if the print head 24 is mounted on the carriage 22. Further, on the ejection port surface 34, in order along the +X direction, the base plate 200Y for ejecting the Y ink, the base plate 200M for ejecting the M ink, the base plate 200C for ejecting the C ink, the base plate 200K for ejecting the K ink, and the base plate 200Rct for ejecting the reaction liquid Rct are installed side by side. Note that the distance in the X direction between the base plate 200K and the base plate 200Rct is longer than the distance between the adjacent base plates from which inks are ejected.

The ejection port array 204Y, which is configured with the multiple ejection ports 202 for ejecting the Y ink, is formed on the base plate 200Y. The ejection port array 204M, which is configured with the multiple ejection ports 202 for ejecting the Mink, is formed on the base plate 200M. The ejection port array 204C, which is configured with the multiple ejection ports 202 for ejecting the C ink, is formed on the base plate 200C. The ejection port array 204K, which is configured with the multiple ejection ports 202 for ejecting the K ink, is formed on the base plate 200K. The ejection port array 204Rct, which is configured with the multiple ejection ports 202 for ejecting the reaction liquid Rct, is formed on the base plate 200Rct. In the print head 24, the ejection port array for ejecting the reaction liquid Rct and the ejection port arrays for ejecting the respective inks are formed on the same plane.

In the present embodiment, the reaction liquid reacts with the solid contents of the inks, specifically, the pigments or the like contained in the inks, to promote aggregation thereof. Accordingly, in the printing apparatus 10, in a case where printing is performed on a print medium with low ink permeability or no permeability, thickening due to pigment aggregation is promoted by mixing the reaction liquid and an ink on the print medium, so that bleeding and beading of the ink are suppressed and favorable image formation can be performed.

<Control Configuration of the Printing Apparatus>

Figure 4:
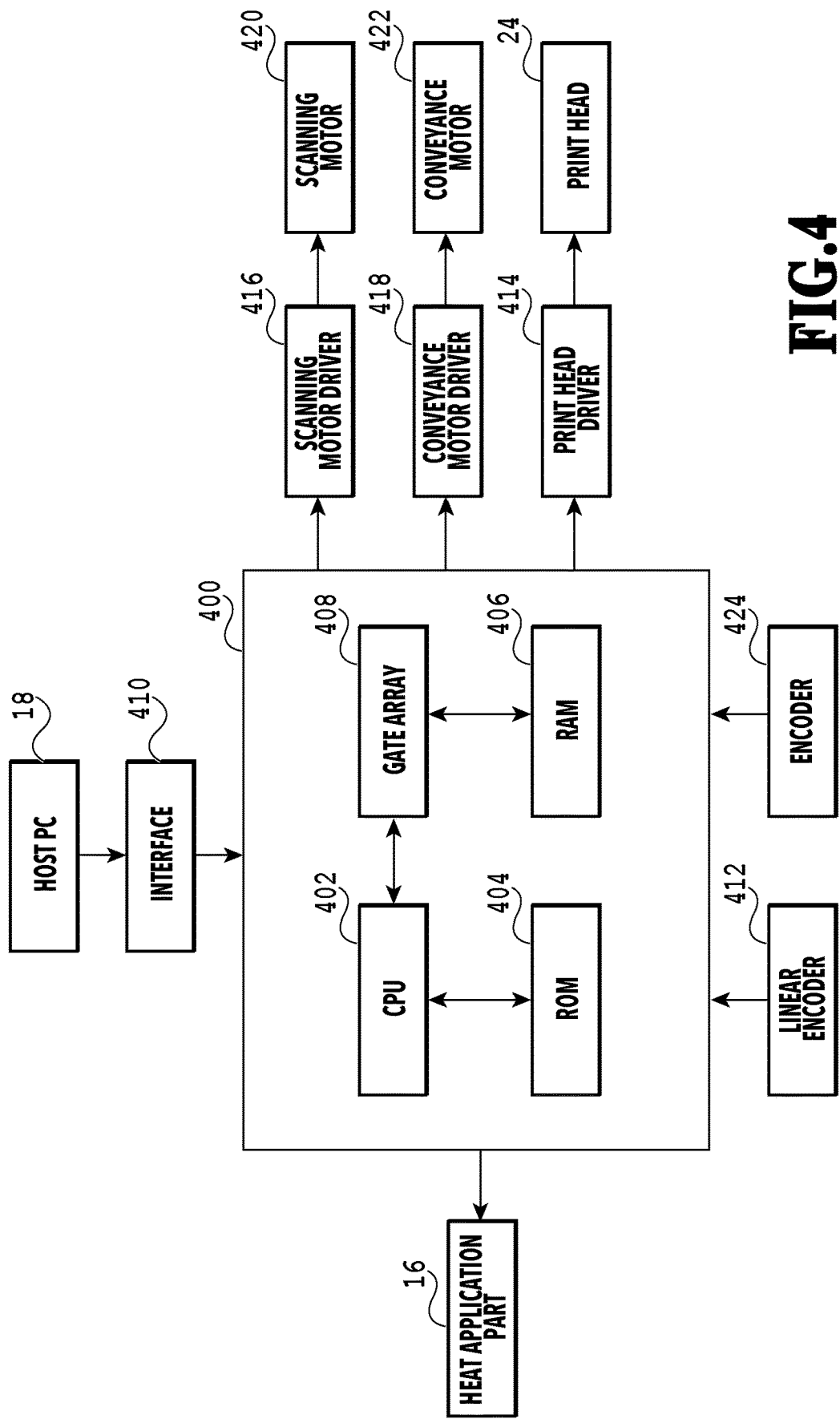
FIG. 4 is a block configuration diagram of a control system of the printing apparatus.

Next, the configuration of a control system of the printing apparatus 10 will be explained. FIG. 4 is a block diagram illustrating the configuration of the control system of the printing apparatus 10. The control part 400 that performs the operation of the entire printing apparatus 10 includes the central processing unit (CPU) 402, the ROM 404, the RAM 406, and the gate array 408. The CPU 402 controls the operation of each constituent member in the printing apparatus 10 and processes input image data, based on various programs. The ROM 404 functions as a memory for performing various kinds of control executed by the CPU 402 and for storing processing programs for image data. The RAM 406 saves various kinds of data (image data, a print signal which is output to the print head 24, etc.) to be used for controlling the printing apparatus 10. The gate array 408 supplies a print signal to the print head 24 and also transmits data among the interface 410 (which will be described later), the CPU 402, and the RAM 406.

The control part 400 is connected to the interface 410, and the information that is output from an external device such as the host PC 18 is input via the interface 410. Various publicly-known devices such as mobile terminals can be used as the external device. The user inputs image data and various kinds of information to the printing apparatus 10 via the external device. Further, the control part 400 is connected to the print head driver 414, the scanning motor driver 416, and the conveyance motor driver 418. The print head driver 414 drives print elements installed on the print head 24 to eject ink, based on a print signal that is output from the control part 400. The scanning motor driver 416 drives the scanning motor 420 to move the carriage 22 in the X direction, based on a signal that is output from the control part 400 according to a signal from the linear encoder 412. The conveyance motor driver 418 drives the conveyance motor 422 to convey the print medium P with the conveyance part, based on a signal that is output from the control part 400 according to a signal from the encoder 424 which obtains information according to the conveyance amount in the conveyance part.

In the control part 400, the CPU 402 and the gate array 408 convert image data that is input from an external device via the interface 410 into print data to be stored in the RAM 406. Further, the control part 400 activates the print head driver 414, the scanning motor driver 416, and the conveyance motor driver 418 in a periodical manner, in order to perform a printing operation with the printing part 14 and a conveyance operation with the conveyance part. Accordingly, the image based on the print data is printed on the print medium P. Further, the control part 400 is connected to the heat application part 16 and outputs, to the heat application part 16, a signal for driving the heat application part 16 to apply heat to the print medium P after printing.

<Inks and the Reaction Liquid>

Next, the inks and the reaction liquid used in the printing apparatus 10 will be explained =Ink=

In the printing apparatus 10, a colorant ink containing a coloring material such as a pigment and a water-soluble resin fine particle ink containing no coloring material or containing a trace amount of coloring material can be used as an ink. These colorant ink and water-soluble resin fine particle ink contain a water-soluble organic solvent. Note that, regarding the colorant ink and the water-soluble resin fine particle ink, various kinds of surfactants, defoaming agents, preservatives, antifungal agents, etc., can be added as appropriate, in order to acquire desired characteristics as needed. As water, it is preferred to use deionized water.

It is preferable that the water-soluble organic solvent has a boiling point of 150° C. or more and 300° C. or less from the viewpoint of wetting and moisture-retaining properties of the head face surface. Further, as the water-soluble organic solvent, it is preferable to use a ketone-based compound such as acetone or cyclohexanone from the viewpoint of the function of a film-forming aid for resin fine particles as well as the swelling and solubility to a print medium on which a resin layer is formed. Further, it is preferable to use a propylene glycol derivative such as tetraethylene glycol dimethyl ether, heterocyclic compounds with a lactam structure such as N-methyl-pyrrolidone and 2-pyrrolidone, etc. Furthermore, it is preferable that the content of the water-soluble organic solvent is 3 wt % or more and 30 wt % or less from the viewpoint of ejection performance.

Examples of the water-soluble organic solvent contained in the inks used in the printing apparatus 10 are shown below. —Alkyl alcohols with 1 to 4 carbons such as methyl alcohol, ethyl alcohol, n-propyl alcohol, isopropyl alcohol, n-butyl alcohol, sec-butyl alcohol, and tert-butyl alcohol—Amides such as dimethylformamide and dimethylacetamide, ketones or ketoalcohols such as acetone and diacetone alcohol, and ethers such as tetrahydrofuran and dioxane—Polyalkylene glycols such as polyethylene glycol and polypropylene glycol—Alkylene glycols in which the alkylene group contains 2 to 6 carbon atoms The alkylene glycols include ethylene glycol, propylene glycol, butylene glycol, triethylene glycol, 1,2,6-hexanetriol, thiodiglycol, hexylene glycol, diethylene glycol, etc. —Lower alkyl ether acetates such as polyethylene glycol monomethyl ether acetate—Glycerin—Lower alkyl ethers of polyhydric alcohols such as ethylene glycol monomethyl (or ethyl) ether, diethylene glycol methyl (or ethyl) ether, and triethylene glycol monomethyl (or ethyl) ether—Polyhydric alcohols such as trimethylolpropane and trimethylolethane—N-methyl-2-pyrrolidone, 2-pyrrolidone, 1,3-dimethyl-2-imidazolidinone The colorant ink contains water-soluble resin fine particles for bringing the print medium and the coloring materials into close contact with each other and improving the scratch resistance (fixability) of printed images. The resin fine particles are melted by heat, and, in the printing apparatus 10, a heater (the heat application part 16 or the like) is used to form a film of the resin fine particles and dry the solvent contained in the ink. In the present embodiment, it is assumed that the resin fine particles are polymer fine particles that exist in a state of being dispersed in liquid (in water).

Examples of the resin fine particles contained in the colorant inks are shown below.—Acrylic resin fine particles synthesized by emulsion polymerization of monomers such as (meth)acrylic acid alkyl esters and (meth)acrylic acid alkyl amides, etc.—Styrene-acrylic resin fine particles synthesized by emulsion polymerization of (meth)acrylic acid alkyl esters, (meth)acrylic acid alkyl amides, etc., and styrene monomers, etc.—Polyethylene resin fine particles, polypropylene resin fine particles, polyurethane resin fine particles, and styrene-butadiene resin fine particles Such resin fine particles may also include core-shell type resin fine particles in which the polymer compositions of the core part and the shell part constituting the resin fine particles are different, resin fine particles obtained by emulsion polymerization around seed particles which are acrylic fine particles synthesized in advance for controlling the particle size, etc. Further, hybrid type resin fine particles in which different resin fine particles such as acrylic resin fine particles and urethane resin fine particles are chemically combined may also be used.

The polymer fine particles existing in a state of being dispersed in liquid may be in a form of resin fine particles obtained by homopolymerizing a monomer with a dissociative group or copolymerizing multiple types of monomers, i.e., what is termed as a self-dispersion type resin fine particle dispersion. Here, the dissociative group may be a carboxyl group, sulfonic acid group, and phosphoric acid group, etc., and the monomer with this dissociative group may be acrylic acid and methacrylic acid. Further, the above-mentioned polymer fine particles may be what is termed as an emulsification dispersion type resin fine particle dispersion in which resin fine particles are dispersed by an emulsifier. As the above-mentioned emulsifier, a material with an anionic electric charge can be used regardless of having a low molecular weight or high molecular weight.

In the present embodiment, the resin fine particle dispersion liquid used in the preparation of a colorant ink is first heated to 70° C. under a nitrogen atmosphere, and, while being stirred in that state, three additive liquids are dropped little by little and polymerization is carried out for 5 hours. Accordingly, a 20% by mass resin fine particle dispersion liquid is obtained. The above-mentioned additive liquids are a hydrophobic monomer consisting of 28.5 parts of methyl methacrylate, a mixed liquid including a hydrophilic monomer consisting of 4.3 parts of p-styrenesulfonic acid sodium and 30 parts of water, and a mixed liquid including a polymerization initiator consisting of 0.05 parts of potassium persulfate and 30 parts of water.

—Preparation of Black Ink (K Ink)
(1) Preparation of Dispersion Liquid

An anionic polymer P-1 [styrene/butyl acrylate/acrylic acid copolymer (polymerization ratio (weight ratio)=30/40/30), acid value 202, weight average molecular weight 6500] is prepared. This is neutralized with a potassium hydroxide aqueous solution and diluted with ion-exchanged water to prepare a homogeneous 10% by mass polymer aqueous solution.

600 g of the above-mentioned polymer solution, 100 g of carbon black which is a black pigment, and 300 g of ion-exchanged water are mixed, and, after being mechanically stirred for a predetermined time period, the non-dispersed materials including coarse particles are removed by a centrifuge separation process to obtain a black dispersion liquid. The obtained black dispersion liquid had a pigment density of 10% by mass.

(2) Preparation of Ink

As shown in the formulation below, the ink is prepared by using the above-mentioned black dispersion liquid and resin fine particle dispersion liquid, to which multiple components are added so as to obtain a predetermined density. Then, the mixed liquid obtained by mixing each component including the black dispersion liquid is sufficiently mixed and stirred. Thereafter, pressure filtration is performed through a microfilter with a pore size of 2.5 μm (manufactured by Fujifilm Corporation) to prepare the colorant ink (black ink) in which the density of the pigment (carbon black), which is a coloring material, is 2% by mass.

Black dispersion liquid: 20 parts
Resin fine particle dispersion liquid: 40 parts
Zonyl FSO-100 (fluorosurfactant manufactured by DuPont): 0.05 parts
2-methyl 1,3 propanediol: 15 parts
2-pyrrolidone: 5 parts
Acetylene glycol EO adduct (manufactured by Kawaken Fine Chemicals Co., Ltd.): 0.5 parts
Ion-exchange water: remnant Preparation of Cyan Ink (C Ink)

(1) Preparation of Dispersion Liquid

Using benzyl acrylate and methacrylic acid as raw materials, an AB-type block polymer with an acid value of 250 and a number average molecular weight of 3000 is made by a conventional method, neutralized with a potassium hydroxide aqueous solution, and diluted with ion-exchanged water, so that a homogeneous 50% by mass polymer aqueous solution is prepared.

200 g of the above-mentioned polymer solution, 100 g of "C.I. Pigment Blue 15:3" which is a cyan pigment, and 700 g of ion-exchanged water are mixed, and, after being mechanically stirred for a predetermined time period, the non-dispersed matters including coarse particles are removed by a centrifuge separation process to obtain a cyan dispersion liquid. The obtained cyan dispersion liquid had a pigment density of 10% by mass.

(2) Preparation of Ink

As shown in the formulation below, the ink is prepared by using the above-mentioned cyan dispersion liquid and resin fine particle dispersion liquid, to which multiple components are added so as to obtain a predetermined density. Then, the mixed liquid obtained by mixing each component including the cyan dispersion liquid is sufficiently mixed and stirred. Thereafter, pressure filtration is performed through a microfilter with a pore size of 2.5 μm (manufactured by Fujifilm Corporation) to prepare the colorant ink (cyan ink) in which the density of the pigment (C.I. Pigment Blue 15:3), which is a coloring material, is 2% by mass.

Cyan dispersion liquid: 20 parts
Resin fine particle dispersion liquid: 40 parts
Zonyl FSO-100 (fluorosurfactant manufactured by DuPont): 0.05 parts
2-methyl 1,3 propanediol: 15 parts
2-pyrrolidone: 5 parts
Acetylene glycol EO adduct (manufactured by Kawaken Fine Chemicals Co., Ltd.): 0.5 parts
Ion-exchange water: remnant Preparation of Magenta Ink (M Ink)

(1) Preparation of Dispersion Liquid

Using benzyl acrylate and methacrylic acid as raw materials, an AB-type block polymer with an acid value of 300 and a number average molecular weight of 2500 is made by a conventional method, neutralized with a potassium hydroxide aqueous solution, and diluted with ion-exchanged water, so that a homogeneous 50% by mass polymer aqueous solution is prepared.

100 g of the above-mentioned polymer solution, 100 g of "C.I. Pigment Red 122" which is a magenta pigment, and 800 g of ion-exchanged water are mixed and mechanically stirred for a predetermined time period. Thereafter, the non-dispersed matters including coarse particles are removed by a centrifuge separation process to obtain a magenta dispersion liquid. The obtained magenta dispersion liquid had a pigment density of 10% by mass.

(2) Preparation of Ink

As shown in the formulation below, the ink is prepared by using the above-mentioned magenta dispersion liquid and resin fine particle dispersion liquid, to which multiple components are added so as to obtain a predetermined density. Then, the mixed liquid obtained by mixing each component including the magenta dispersion liquid is sufficiently mixed and stirred. Thereafter, pressure filtration is performed through a microfilter with a pore size of 2.5 μm (manufactured by Fujifilm Corporation) to prepare the colorant ink (magenta ink) in which the density of the pigment (C.I. Pigment Red 122), which is a coloring material, is 3% by mass.

Magenta dispersion liquid: 30 parts
Resin fine particle dispersion liquid: 40 parts
Zonyl FSO-100 (fluorosurfactant manufactured by DuPont): 0.05 parts
2-methyl 1,3 propanediol: 15 parts
2-pyrrolidone: 5 parts
Acetylene glycol EO adduct (manufactured by Kawaken Fine Chemicals Co., Ltd.): 0.5 parts
Ion-exchange water: remnant Yellow Ink (1) Preparation of Dispersion Liquid The above-mentioned anionic polymer P-1 is neutralized with a potassium hydroxide aqueous solution and diluted with ion-exchanged water to prepare a homogeneous 10% by mass polymer aqueous solution.

300 g of the above-mentioned polymer solution, 100 g of "C.I. Pigment Yellow 74" which is a yellow pigment, and 600 g of ion-exchanged water are mixed and mechanically stirred for a predetermined time period. Thereafter, the non-dispersed matters including coarse particles are removed by a centrifuge separation process to obtain a yellow dispersion liquid. The obtained yellow dispersion liquid bad a pigment density of 10% by mass.

(2) Preparation of Ink

As shown in the formulation below, the ink is prepared by using the above-mentioned yellow dispersion liquid and resin fine particle dispersion liquid, to which multiple components are added and mixed so as to be dissolved and dispersed by being sufficiently stirred. Thereafter, pressure filtration is performed through a microfilter with a pore size of 1.0 μm (manufactured by Fujifilm Corporation) to prepare the colorant ink (yellow ink) in which the density of the pigment (C.I. Pigment Yellow 74), which is a coloring material, is 4% by mass.

Yellow dispersion liquid: 40 parts
Resin fine particle dispersion liquid: 40 parts
Zonyl FSO-100 (fluorosurfactant manufactured by DuPont): 0.025 parts
2-methyl 1,3 propanediol: 15 parts
2-pyrrolidone: 5 parts
Acetylene glycol EO adduct (manufactured by Kawaken Fine Chemicals Co., Ltd.): 1 part
Ion-exchange water: remnant =Reaction Liquid=

In the present embodiment, the reaction liquid used in the printing apparatus 10 contains a reactive component that reacts with a coloring material (pigment) included in each ink to aggregate or gel the coloring material. This reactive component is a component capable of destroying the dispersion stability of ink if being blended with an ink which has a coloring material that is stably dispersed in an aqueous medium due to the action of an ionic group, and, for example, glutaric acid can be used. Note that the reactive component is not limited to glutaric acid, and various organic acids and polyvalent metal salts may be used as long as they are water-soluble. On the basis of the total mass of the composition included in the reaction liquid, the content of the reactive component is preferably 0.1% by mass or more and 90.0% by mass or less and further preferably 1.0% by mass or more and 70.0% by mass or less.

In the preparation of the reaction liquid, glutaric acid (manufactured by Fujifilm Wako Pure Chemical Industries, Ltd.) is used and multiple components are mixed, as shown in the following formulation.

Glutaric acid: 2 parts
2-Pyrrolidone: 5 parts
2-methyl 1,3 propanediol: 15 parts
Acetylene glycol EO adduct (manufactured by Kawaken Fine Chemicals Co., Ltd.): 0.5 parts <Print Medium>

Next, a print medium used in the printing apparatus 10 will be explained. In the present embodiment, a print medium that does not absorb ink, such as a vinyl chloride sheet, is used as a print medium to be a target of printing. Note that the print medium used in the printing apparatus 10 is not limited to a print medium that does not absorb ink, such as a vinyl chloride sheet, and it is also possible to use a print medium that does not easily absorb ink. A print medium that does not easily absorb ink is, for example, a print medium such as coated printing paper that has lower ink absorbency and permeability than inkjet-dedicated paper.

A vinyl chloride sheet is a flexible sheet produced by adding a plasticizer to a vinyl chloride resin which is the main raw material. A vinyl chloride sheet is excellent in printing properties for gravure printing, screen printing, etc., and in embossability (performance representing ease of applying an asperity pattern by embossing). Because of these characteristics, various expressions are possible using vinyl chloride sheets, and vinyl chloride sheets are used in many products such as tarpaulins, canvas, and wallpaper.

Since vinyl chloride resin is the main raw material of a vinyl chloride sheet, there is no permeability for water-based ink. Therefore, in printing on a vinyl chloride sheet with a water-based ink, the ink overflows on the printing surface, which results in significant image deterioration and drying deterioration. As the vinyl chloride sheet, for example, Scotch Cal Graphical Film IJ1220-10 (glossy specification, manufactured by 3M Japan Ltd.), which is a vinyl chloride sheet for outdoor signs and is a print medium for inkjet, can be used.

Coated printing paper is a formal print sheet that is actually used for final printing to make a product (merchandise). Print sheets are made from pulp, and one that is used as it is referred to as uncoated paper and one whose sheet surface is smoothly coated with a while pigment or the like to form a coating layer is referred to as coated paper (coated printing paper). The coating layer is formed by coating with about several $g/m^2$ to 40 $g/m^2$ of mixed paint containing a sizing agent such as a synthetic resin, a filler such as kaolin, and a paper strength enhancer such as starch. Sizing agents are used to limit the liquid absorbency of gaps in pulp and prevent bleeding of water-based inks. Fillers are used to improve opacity, whiteness, smoothness, and the like. The average capillary pore radius in coated paper is normally distributed around about 0.06 µm, and water (liquid component) can permeate through a large number of capillaries in coated paper (capillary phenomenon). Note that, since the pore volume is very small, the permeability of coated paper is lower than that of inkjet-dedicated paper.

As a method for evaluating the permeability of ink to a print medium, Bristow's method, which is described in JAPAN TAPPI paper pulp test method No. 5 "Method for Determining the Liquid Absorbability of Paper and Board", can be used. Since this Bristow's method is a publickly-known technique, its detailed explanation is omitted, but its outline is as follows.

A certain amount of ink is injected into a holding container with a slit including an opening of a predetermined size, and a print medium processed into a strip shape and wound around a disk is brought into contact with an ink via the slit. Then, the disk is rotated while the position of the holding container is fixed, and the area (length) of the ink band transferred to the print medium is measured. Thereafter, the transfer amount per unit area ($ml/m^2$) is calculated from the area of the ink band. This transfer amount indicates the capacity of ink absorbed by the print medium in a predetermined time period. Here, the predetermined time period is defined as a transfer time period. The transfer time period (millisecond$^{1/2}$) corresponds to the time period in which the slit comes into contact with the print medium and is converted from the rotation speed of the disk and the width of the slit.

In a measurement of the transfer amount of a water-based ink on a general coated printing paper by Bristow's method, the transfer amount in a transfer time period of 1 second took a value of less than 20 $ml/m^2$. Note that, although many of inkjet-dedicated paper exhibit a transfer amount of 30 $ml/m^2$ or more for water-based inks in Bristow's method, there are some that exhibit a transfer amount of less than 20 $ml/m^2$. It can be said that such inkjet-dedicated paper is a print medium with low absorbency and permeability. Therefore, the print medium with low permeability is not limited to coated paper and includes a print medium that exhibits absorbency and permeability as low as that of coated paper among other print media such as inkjet-dedicated paper.

<Multi-Pass Printing>

Next, an explanation is given of multi-pass printing in which scanning is performed multiple times with a print head on a print medium to print an image in a unit area on the print medium. In multi-pass printing, the inks and reaction liquid are ejected from the print head 24 in accordance with print data that determines ejection or non-ejection of the inks and reaction liquid for each of multiple pixels in each of the multiple times of scanning.

=Generation of Print Data=

If image data is input from the host PC 18 or the like, the printing apparatus 10 performs image processing such as ink color separation processing and quantization processing in the control part 400 to generate print data corresponding to each scanning. Here, the case of generating print data for printing an image in a unit area with 8 passes using a dither pattern and mask patterns will be explained. In the explanation here, for ease of understanding, it is assumed that the image data is 8-bit data capable of representing 256 stages of tonal values from 0 to 255. Further, it is assumed that both dither pattern and mask pattern have a size corresponding to the area of 8 pixels×8 pixels, which corresponds to a unit area.

FIG. 5A to FIG. 5D are diagrams for explaining a method of generating print data corresponding to each scanning.

Figures 5A, 5B:
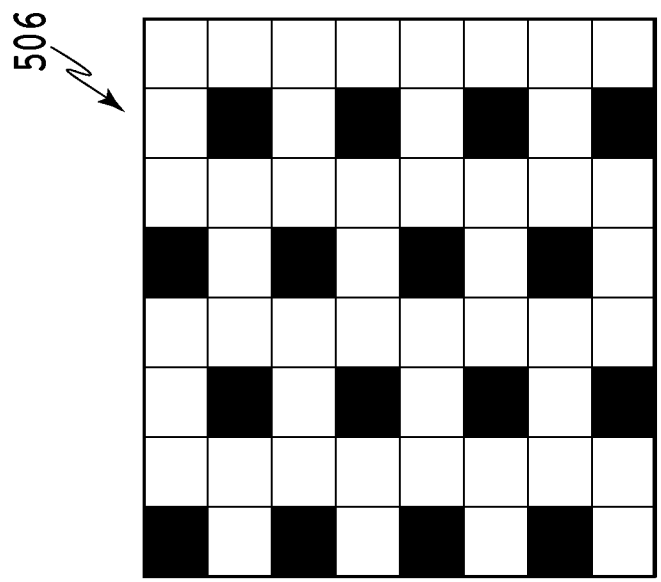
FIG. 5A to FIG. 5D are diagrams for explaining a method of generating print data corresponding to respective passes of multi-pass printing.
Figure 5C:
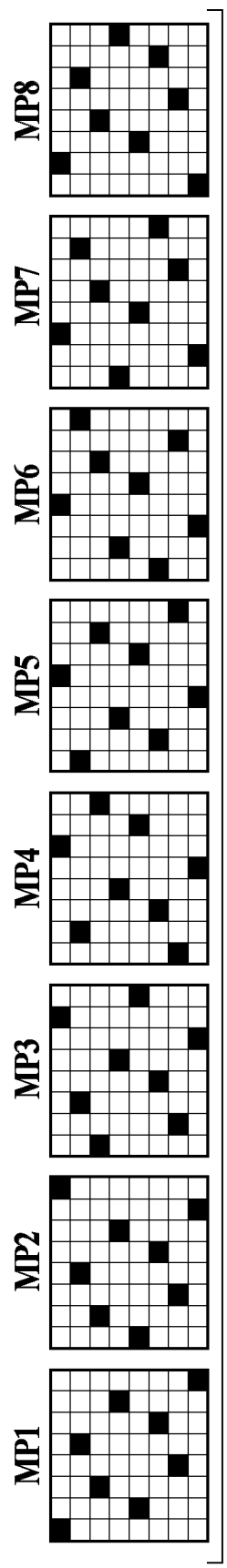
Figure 5D:
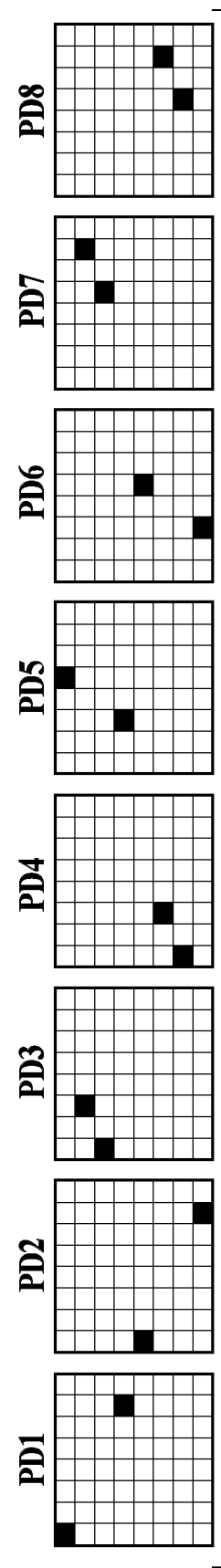

FIG. 5A is a diagram illustrating an example of a dither pattern used in quantization processing. FIG. 8B is a diagram schematically illustrating binary data generated from image data in which the tonal values of all pixels are "64" by using the dither pattern of FIG. 5A. FIG. 5C is a diagram schematically illustrating mask patterns corresponding to respective scanning. FIG. 5D is a diagram schematically illustrating print data corresponding to respective scanning, which is generated by applying the mask patterns of FIG. 5C to the binary data of FIG. 5B. Note that, in FIG. 5B and FIG. 5D, the black pixels indicate the pixels in which ink is to be ejected, and the white pixels indicate the pixels in which ink is not to be ejected. Further, in FIG. 5C, the black pixels indicate the print-allowed pixels in which printing by ink ejection is allowed, and the white pixels indicate the print-not-allowed pixels in which printing by ink ejection is restricted.

In the present embodiment, in each scanning, a maximum of 1 dot is applied per pixel with a unit pixel of 2400 dpi in the X direction and 1200 dpi in the Y direction. Therefore, if 1 dot for a unit pixel of 1200 dpi is 100%, a maximum print duty of 200% can be applied.

The control part 400 executes image processing such as ink color separation processing on the input image data to convert the input image data into image data in which each pixel has a multi-value tonal value. Note that the above-mentioned image processing is not limited to ink color separation processing and includes publicly-known technologies such as ink color conversion processing and correction processing. Thereafter, quantization processing is performed on the image data configured with multi-value tonal values using the dither pattern 500 stored in a storage area such as the ROM 404. Here, in the dither pattern 500, different threshold values are set for the respective pixels (see FIG. 5A).

Therefore, in the quantization processing, the multi-value tonal value of each pixel in the converted image data is compared with the threshold value that is set for the corresponding pixel of the dither pattern 500. As a result of comparison, if the tonal value is greater than the threshold value, the tonal value is converted to a 1-bit pixel value (for example, "1") indicating ejection of ink in the pixel where the tonal value is located. Further, as a result of comparison, if the tonal value is the threshold value or less, the tonal value is converted to a pixel value (for example, "0") indicating non-ejection of ink in the pixel where the tonal value is located. In this way, the image data configured with multi-value tonal values is converted into image data configured with binary pixel values (binary image data which will be described later).

Note that, in the explanation of the generation of print data here, although the case where the same tonal value is input to all the pixels in a unit area will be described, it is also possible that different tonal values are input to the pixels. For example, if "64" is input as the tonal value for each pixel, the threshold value for the pixel 502 of the dither pattern 500 is "9", which is smaller than the tonal value "64". Therefore, in the pixel corresponding to the pixel 502, the tonal value "64" is converted into a pixel value representing non-ejection of ink. Further, the threshold value for the pixel 504 is "93", which is greater than the tonal value "64". Therefore, in the pixel corresponding to the pixel 504, the tonal value "64" is converted into a pixel value representing ejection of ink.

In this way, by comparing the tonal value of each pixel with the threshold value using the dither pattern 500, the multi-value image data is converted into the binary image data. That is, by quantization processing, the binary image data 506 representing ejection and non-ejection of ink is generated from image data that has multi-value tonal values for the respective pixels (see FIG. 5B).

Thereafter, print data corresponding to each scanning is generated by use of a mask pattern (see FIG. 5C) held in association with each scanning. Print data corresponding to each scanning is generated by acquiring logical AND of the binary image data 506 and the mask pattern associated with each scanning. That is, only in a case where binary data representing ejection of ink is input to a pixel of the binary image data 506 corresponding to a print-allowed pixel in the mask pattern, print data representing ejection of ink is generated for that pixel.

Specifically, by applying the mask pattern MP1 associated with the first scanning to the binary image data 506, the print data PD1 corresponding to the first scanning, in which the binary data representing ejection of ink that is set for the respective pixels of the binary image data 506 is partially distributed, is generated. Similarly, the mask pattern MP2 associated with the second scanning is applied to the binary image data 506 to generate the print data PD2 corresponding to the second scanning. The mask pattern MP3 associated with the third scanning is applied to the binary image data 506 to generate the print data PD3 corresponding to the third scanning. The mask pattern MP4 associated with the fourth scanning is applied to the binary image data 506 to generate the print data PD4 corresponding to the fourth scanning. The mask pattern MP5 associated with the fifth scanning is applied to the binary image data 506 to generate the print data PD5 corresponding to the fifth scanning. The mask pattern MP6 associated with the sixth scanning is applied to the binary image data 506 to generate the print data PD6 corresponding to the sixth scanning. The mask pattern MP7 associated with the seventh scanning is applied to the binary image data 506 to generate the print data PD7 corresponding to the seventh scanning. The mask pattern MP8 associated with the eighth scanning is applied to the binary image data 506 to generate the print data PD8 corresponding to the eighth scanning (see FIG. 5D).

The mask patterns MP1 to MP8 have a complementary relationship with each other. Therefore, in the first to eighth scanning, an image based on the binary image data 506 is printed in the unit area by ejecting the inks and reaction liquid in accordance with the corresponding print data, respectively. In this way, in the present embodiment, the control part 400 functions as an image processing apparatus equipped with a print data generation part that generates print data from image data. Note that, although the explanations with FIG. 5A to FIG. 5D are given with the size of 8 pixels×8 pixels for ease of understanding, the size is usually large, such as 128 pixels×128 pixels.

=Print Processing=

Figure 6:
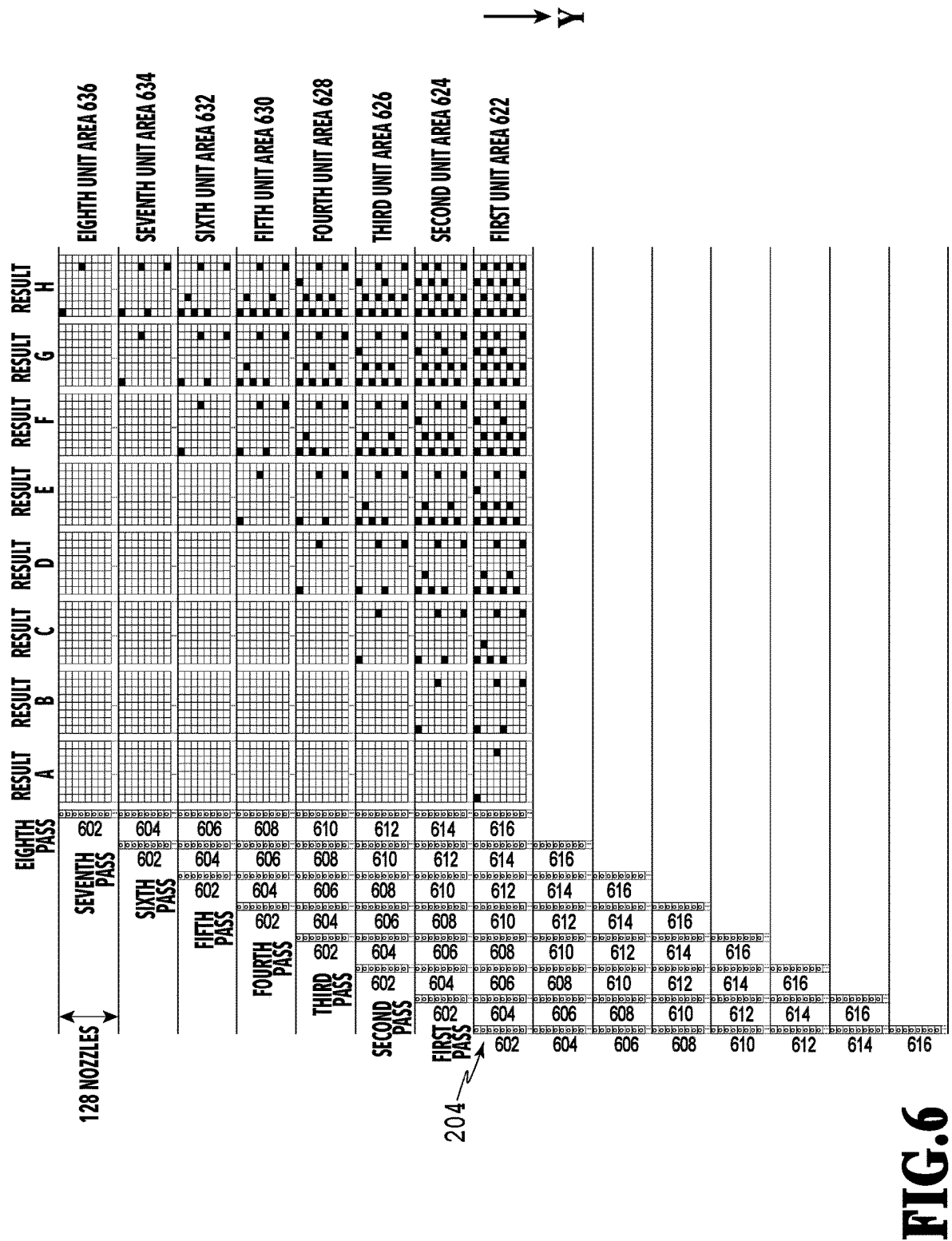
FIG. 6 is a diagram for explaining eight-pass printing in a unit area.

Upon obtaining print data corresponding to each scanning, the printing apparatus 10 performs printing on a print medium based on the print data. In the explanation of the print processing in the printing apparatus 10, the case where printing is performed based on the above-mentioned print data PD1 to PD8 will be described. FIG. 6 is a diagram for explaining the printing in a unit area on a print medium, which is executed by the eight times of scanning performed with printing in the printing apparatus 10 based on the print data PD1 to PD8. The explanation with FIG. 6 focuses on one ejection port array 204 in the print head 24.

The ejection port array 204 is divided into eight groups, each of which has 128 consecutive ejection ports 202. Specifically, the ejection port array 204 is divided into the group 602, the group 604, the group 606, the group 608, the group 610, the group 612, the group 614, and the group 616 in order from the upstream side in the +Y direction. The mask patterns MP1 to MP8 explained in FIG. 5A to FIG. 5D are associated with these groups 602 to 616, respectively, in order from the upstream side in the +Y direction.

In the first scanning (first pass), ink is ejected from the group 602 to the first unit area 622 on the print medium P, based on the print data PD1 (see RESULT A). Next, the print medium P is moved in the +Y direction relative to the print head 24 by a predetermined distance corresponding to 128 ejection ports 202. Thereafter, the second scanning is performed.

In the second scanning (second pass), ink is ejected from the group 604 to the first unit area 622 on the print medium P, based on the print data PD2, and ink is ejected from the group 602 to the second unit area 624, based on the print data PD1 (see RESULT B). Then, after the print medium P is moved in the +Y direction relative to the print head 24 by the above-mentioned predetermined distance, the third scanning is performed.

In the third scanning (third pass), ink is ejected from the group 606 to the first unit area 622 on the print medium P, based on the print data PD3, and ink is ejected from the group 604 to the second unit area 624, based on the print data PD2. Further, ink is ejected from the group 602 to the third unit area 626, based on the print data PD1 (see RESULT C). Then, after the print medium P is moved in the +Y direction relative to the print head 24 by the above-mentioned predetermined distance, the fourth scanning is performed.

In the fourth scanning (fourth pass), ink is ejected from the group 608 to the first unit area 622 on the print medium P, based on the print data PD4, and ink is ejected from the group 606 to the second unit area 624, based on the print data PD3. Further, ink is ejected from the group 604 to the third unit area 626, based on the print data PD2, and ink is ejected from the group 602 to the fourth unit area 628, based on the print data PD1 (see RESULT D). Then, after the print medium P is moved in the +Y direction relative to the print head 24 by the above-mentioned predetermined distance, the fifth scanning is performed.

In the fifth scanning (fifth pass), ink is ejected from the group 610 to the first unit area 622 on the print medium P, based on the print data PD5, and ink is ejected from the group 608 to the second unit area 624, based on the print data PD4. Further, ink is ejected from the group 606 to the third unit area 626, based on the print data PD3, and ink is ejected from the group 604 to the fourth unit area 628, based on the print data PD3. Furthermore, ink is ejected from the group 602 to the fifth unit area 630, based on the print data PD1 (see RESULT E). Then, after the print medium P is moved in the +Y direction relative to the print head 24 by the above-mentioned predetermined distance, the sixth scanning is performed.

In the sixth scanning (sixth pass), ink is ejected from the group 612 to the first unit area 622 on the print medium P, based on the print data PD6, and ink is ejected from the group 610 to the second unit area 624, based on the print data PD5. Further, ink is ejected from the group 608 to the third unit area 626, based on the print data PD4, and ink is ejected from the group 606 to the fourth unit area 628, based on the print data PD3. Furthermore, ink is ejected from the group 604 to the fifth unit area 630, based on the print data PD2, and ink is ejected from the group 602 to the sixth unit area 632, based on the print data PD1 (see RESULT F). Then, after the print medium P is moved in the +Y direction relative to the print head 24 by the above-mentioned predetermined distance, the seventh scanning is performed.

In the seventh scanning (seventh pass), ink is ejected from the group 614 to the first unit area 622 on the print medium P, based on the print data PD7, and ink is ejected from the group 612 to the second unit area 624, based on the print data PD6. Further, ink is ejected from the group 610 to the third unit area 626, based on the print data PD5, and ink is ejected from the group 608 to the fourth unit area 628, based on the print data PD4. Furthermore, ink is ejected from the group 606 to the fifth unit area 630, based on the print data PD3, and ink is ejected from the group 604 to the sixth unit area 632, based on the print data PD2. Moreover, ink is ejected from the group 602 to the seventh unit area 634, based on the print data PD1 (see RESULT G). Then, after the print medium P is moved in the +Y direction relative to the print head 24 by the above-mentioned predetermined distance, the eighth scanning is performed.

In the eighth scanning (eighth pass), ink is ejected from the group 616 to the first unit area 622 on the print medium P, based on the print data PD8, and ink is ejected from the group 614 to the second unit area 624, based on the print data PD7. Further, ink is ejected from the group 612 to the third unit area 626, based on the print data PD6, and ink is ejected from the group 610 to the fourth unit area 628, based on the print data PD5. Furthermore, ink is ejected from the group 608 to the fifth unit area 630, based on the print data PD4, and ink is ejected from the group 606 to the sixth unit area 632, based on the print data PD3. Moreover, ink is ejected from the group 604 to the seventh unit area 634, based on the print data PD2, and ink is ejected from the group 602 to the eighth unit area 636, based on the print data PD1 (see RESULT H).

In this way, if the eighth scanning is completed, an image based on the binary image data 506 is printed in the first unit area 622, and ink is ejected to 25% of a printable pixel area, which corresponds to the tonal value (64/255).

<Problems Caused by Conventional Technologies and Findings by the Inventors of the Present Application>

=Problems Caused by Conventional Technologies=

In the printing apparatus 10, the reaction liquid is first ejected onto a unit area and then the inks are ejected, and thus printing is performed while ink bleeding and beading on a print medium with no (or low) ink permeability are suppressed. The ink droplets applied to the print medium are mixed with the previously applied reaction liquid, and thus the viscosity thereof is increased. In the conventional technology, since inks are simply applied after application of a reaction liquid, the ink droplets are cured in a state where the shapes thereof are raised, and thus the height of the formed dots and surficial asperity increase. Accordingly, compared to the case where the reaction liquid is not applied, the gloss image clarity of the printed image is reduced. The reduction in gloss image clarity due to such shapes of dots appears particularly conspicuously in intermediate density tone, in which about one ink droplet is applied to one pixel area. Note that gloss image clarity is a feature amount representing the sharpness of the image of illumination that appears. As the gloss image clarity value of an object is larger, the image of the illumination that appears in the object is observed more clearly, and, as the gloss image clarity value of an object is smaller, the image of the illumination that appears in the object is observed less clearly.

=Findings by the Inventors of the Present Application=

The inventors of the present application conducted various kinds of experiments, and, as a result of examination based on the results of the experiments, the inventors found that the reduction in gloss image clarity caused by dot shapes can be suppressed by adjusting the ejection timings of a reaction liquid and inks as described below. More specifically, the inventors of the present application found that the shape of a dot formed by an ink droplet changes depending on the degree of wetting and spreading of the background reaction liquid at the timing of application of the ink.

FIG. 7A to FIG. 7D are diagrams for explaining the findings obtained by the inventors of the present application. FIG. 7A to FIG. 7C are diagrams illustrating changes in ink dot shapes according to the degree of wetting and spreading of the reaction liquid, and FIG. 7D is a table illustrating the height of dot shapes and the degree of gloss image clarity in each of FIG. 7A to FIG. 7C. If the reaction liquid droplet 702 ejected from the print head 24 lands on the print medium P, the reaction liquid droplet 702 wets and spreads over the print medium P as time elapses, and its diameter increases.

If the ink droplet 704 is applied to the reaction liquid droplet 702a, which is in the state where a short period of time has elapsed after the landing and thus the wetting and spreading degree is low, the mixed droplet of the reaction liquid droplet and the ink droplet becomes thickened in a highly raised state. Therefore, as in FIG. 7A, the dot 706 with a small diameter and high height is formed. Further, if the ink droplet 704 is applied to the reaction liquid droplet 702b, which is in the state where a longer period of time than in FIG. 7A has elapsed after the landing and thus the wetting and spreading degree is high to some extent, the above-mentioned mixed droplet becomes thickened in a less highly raised state, compared to the case of FIG. 7A. Therefore, as in FIG. 7B, the dot 708 with a larger diameter and lower height than the dot 706 is formed. Regarding the dot 706 and the dot 708, since the dot 708 has a larger diameter and lower height, the reduction in gloss image clarity of intermediate density tone is suppressed.

If a certain amount or more of reaction liquid droplet 702 with a longer period of time elapsed after the landing than in FIG. 7B is applied, the reaction liquid droplet 702 that has landed wets and spreads, and adjacent reaction liquid droplets come into contact with each other and coalesce, so as to form the thin reaction liquid film 702c. If ink droplets are applied onto this reaction liquid film 702c, the ink droplets 704 are mixed with the reaction liquid film 702c and thickened in a slightly raised state. Therefore, as in FIG. 7C, the dot 710 with a larger diameter and lower height than the dot 708 is formed. Since the dot 710 has a larger diameter and lower height than the dot 708, the reduction in gloss image clarity of intermediate density tone is more pronounced than that with the dot 708. In this way, in a case where the reaction liquid droplet 702 has spread sufficiently over the print medium to be thin film like, the dot formed with an applied ink droplet has a large diameter and low height and has high gloss image clarity (see FIG. 7D).

The reaction liquid is in a droplet shape at the point in time of being applied onto the print medium (see FIG. 7A) and then wets and spreads over the print medium as time elapses (see FIG. 7B), and, as time further elapses, adjacent reaction liquids that have wet and spread come into contact with each other and coalesce, so as to form a reaction liquid film (see FIG. 7C). In this way, it takes a certain amount of time for the reaction liquid applied onto the print medium to form a reaction liquid film. Note that the shape of the reaction liquid film is not maintained forever. That is, the film thickness of the reaction liquid film decreases with elapse of time due to evaporation of water and solvent components in the reaction liquid. Then, the film shape of the reaction liquid film dissolves due to the evaporation in a certain amount of time or more after the film is formed, and the reaction liquid film returns to independent droplet shapes.

Figure 8:
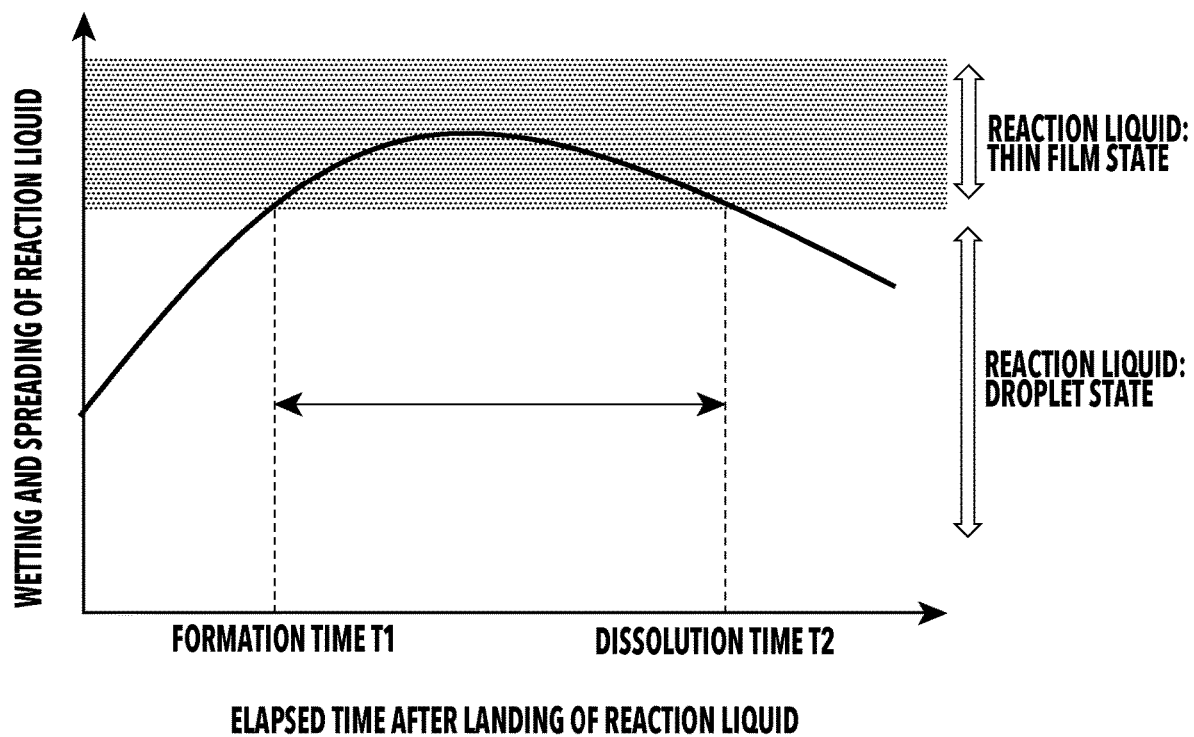
FIG. 8 is a graph illustrating the degree of wetting and spreading of reaction liquid droplets in relation to the elapsed time after the landing of the reaction liquid droplets.

Here, with reference to FIG. 8, the behavior of a reaction liquid after landing on a print medium will be explained. FIG. 8 is a graph illustrating the degree of wetting and spreading of a reaction liquid on a print medium in relation to the elapsed time after the landing of the reaction liquid. In FIG. 8, the horizontal axis indicates the elapsed time after the landing of the reaction liquid, and the vertical axis indicates the degree of wetting and spreading of the reaction liquid. Further, in the following explanation, the time from the timing where the reaction liquid lands on the print medium to the timing where a reaction liquid film is formed is referred to as the formation time T1. Furthermore, the time from the timing where the reaction liquid lands on the print medium to the timing where the reaction liquid film is dissolved is referred to as the dissolution time T2.

After landing on the print medium, the reaction liquid droplets wet and spread on the print medium as the time elapses, and, if the elapsed time reaches the formation time T1, adjacent reaction liquid droplets come into contact with each other and coalesce, so as to form a reaction liquid film. Here, the film thickness of the formed reaction liquid film decreases due to evaporation of water and solvent components in the reaction liquid, and, if the elapsed time reaches the dissolution time T2, the film shape thereof dissolves, and the formed reaction liquid film returns to independent droplet shapes. Therefore, the relationship between the formation time T1 and the dissolution time T2 is T1<T2. Further, the formation time T1 and the dissolution time T2 depend on the wettability of the reaction liquid to the print medium and the application amount of the reaction liquid. Note that the formation time T1 and the dissolution time T2 differ depending on the type of reaction liquid to be used, the type of print medium to be used, the temperature of the usage environment, etc. Thus, the formation time T1 and the dissolution time T2 are obtained from experiments according to, for example, a combination of various conditions.

<Multi-Pass Printing According to the Present Embodiment>

Therefore, in the present embodiment, while a thin reaction liquid film is formed on the print medium, ink droplets are ejected onto the reaction liquid film. Specifically, during multi-pass printing, ink is applied to pixel areas of intermediate density tone at the timing where the elapsed time from the timing where the reaction liquid is ejected is equal to or longer than the formation time T1 (the first time or longer) and shorter than the dissolution time T2 (shorter than the second time). Note that the technology for controlling such a timing of ink application is applied, for example, to pixel areas corresponding to intermediate density tone where a single dot shape has a large effect on the gloss image clarity and not to pixel areas of low density tone and high density tone. Note that the later-described timing control of ink application is not limited to application only to pixel areas of intermediate density tone and may be applied to pixel areas of low density tone and high density tone. That is, the timing control is applied at least to pixel areas of intermediate density tone.

=Unit Mask Pattern=

Figure 9:
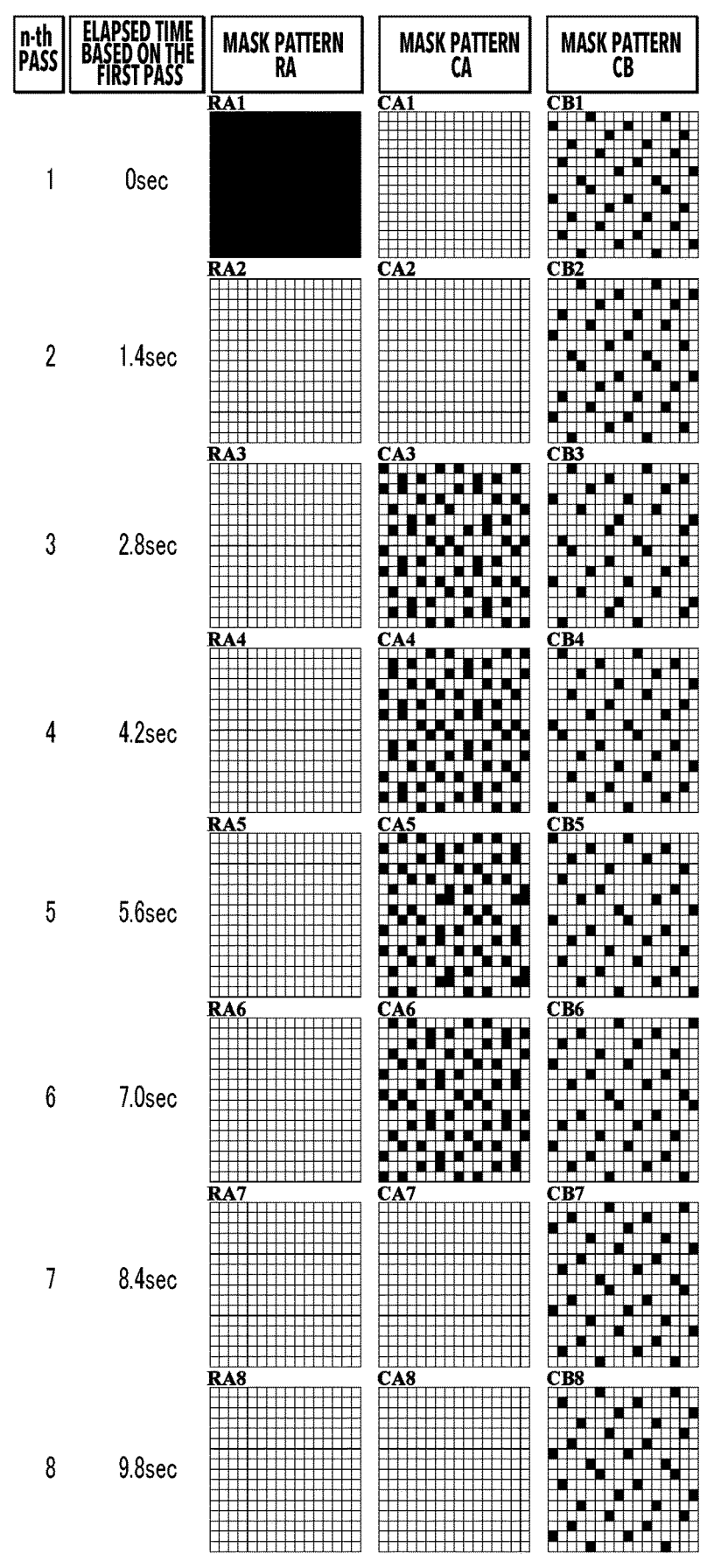

In FIG. 9, a unit mask pattern for the reaction liquid and unit mask patterns for the inks used in the present embodiment are illustrated. In FIG. 9, mask patterns for printing in a unit area with 8 passes is illustrated, and the mask pattern RA indicates a unit mask pattern for the reaction liquid. Further, in FIG. 9, the mask pattern CA indicates a unit mask pattern for the inks to be applied to areas of intermediate density tone, for which the timing of ink application is controlled. Furthermore, in FIG. 9, the mask pattern CB indicates a unit mask pattern for the inks to be applied to the areas other than the areas of intermediate density tone, i.e., areas of low density tone and high density tone, for which the timing of ink application is not controlled. A unit mask pattern is a mask pattern corresponding to an area with a predetermined number of pixels and has a size in which at least one unit mask pattern can be arranged in a predetermined area that is a minimum unit area obtained by dividing binary image data of each ink in the later-described mask pattern generation processing. In the present embodiment, a unit mask pattern is a mask pattern corresponding to an area of 16 pixels×16 pixels. A unit mask pattern is prepared in association with each of the groups obtained by dividing the ejection port array 204 (for example, groups corresponding to a unit area, which are represented as the above-mentioned groups 602 to 616). Such unit mask patterns are held in a storage area such as the ROM 404. That is, in the present embodiment, the storage area such as the ROM 404 functions as a holding part that holds unit mask patterns.

In the areas of low density tone and high density tone where the timing of ink application is not controlled, the mask pattern CB, i.e., a mask pattern that does not cause bias in the printing rate of each pass, is used. Accordingly, it is possible to prevent the usage frequency of each ejection port 202 of the ejection port array 204 from being extremely biased. Further, the durable life of the print head 24 can be ensured.

The mask pattern RA is a mask pattern that is applied to the reaction liquid application data in intermediate density tone. Ideally, in the areas of intermediate density tone, it is preferable that the reaction liquid is collectively applied by the group (corresponding to the group 602) located on the most upstream side in the +Y direction of the ejection port array 204 in the first pass (the first scanning) and is not applied in the second and subsequent passes. Therefore, the mask pattern RA is formed so that the reaction liquid can be applied to all pixels in the first pass. That is, in RA1 of the mask pattern RA of the first pass, all pixels are print-allowed pixels. Further, in RA2 of the second pass, RA3 of the third pass, RA4 of the fourth pass, RA5 of the fifth pass, RA6 of the sixth pass, RA7 of the seventh pass, and RA8 of the eighth pass, all pixels are print-not-allowed pixels. Accordingly, by making all reaction liquid droplets land in the same pass, it is possible to make all reaction liquid droplets similarly wet and spread, so as to form a more uniform reaction liquid film. Further, it is possible to suppress variations in the formation time T1 and the dissolution time T2 within a unit area.

The mask pattern CA is designed based on the inter-pass time difference (elapsed time from the printing of the n-th pass to the printing of the n+1-th pass), the formation time T1, and the dissolution time T2. That is, the mask pattern CA is designed such that ink is ejected in a period of the formation time T1 or later and earlier than the dissolution time T2 after the reaction liquid is ejected. In the explanation using FIG. 9, it is assumed that the inter-path time difference is 1.4 sec.

In FIG. 9, the n-th pass application time Trc_n based on the formation timing (reaction liquid application timing) of the first pass is indicated as the elapsed time based on the first pass. The application time Trc_2 of the second pass is 1.4 sec, the application time Trc_3 of the third pass is 2.8 sec, the application time Trc_4 of the fourth pass is 4.2 sec, and the application time Trc_5 of the fifth pass is 5.6 sec.

Further, the application time Trc_6 of the sixth pass is 7.0 sec, the application time Trc_7 of the seventh pass is 8.4 sec, and the application time Trc 8 of the eighth pass is 9.8 sec.

The timing where the reaction liquid maintains the film shape is in a period of the formation time T1 or later and earlier than the dissolution time T2 after the reaction liquid droplets land on the print medium. Therefore, the mask pattern CA is a pattern in which ink is not applied in the passes whose application time based on the pass for applying the reaction liquid is earlier than the formation time T1 or the dissolution time T2 or later and ink is applied in the passes whose application time is the formation time T1 or later and earlier than the dissolution time T2. The formation time T1 and the dissolution time T2 can be obtained, for example, by applying a reaction liquid using the mask pattern RA to a typical print medium used in the printing apparatus 10 and then observing the process of wetting and spreading and the process of evaporation and contraction of the reaction liquid droplets after the application. In the present embodiment, the formation time T1 is 2.4 sec, and the dissolution time T2 is 8.0 sec.

Therefore, with the mask pattern CA of the present embodiment, in the first pass and the second pass where the application time is earlier than the formation time T1, ink is not applied since it is determined that the reaction liquid droplets are still in the droplet shape. Further, in the third pass to the sixth pass where the application time is equal to or later than the formation time T1 and earlier than the dissolution time T2, ink is applied since it is determined that a reaction liquid film has been formed with the reaction liquid droplets. Furthermore, in the seventh pass and the eighth pass whose application time is equal to or later than the dissolution time T2, ink is not applied since it is determined that the film shape has been dissolved and returned to the liquid droplet shape.

Therefore, in the present embodiment, the mask pattern CA is a pattern in which print-allowed pixels for all pixels are allocated to four passes from the third pass to the sixth pass. Specifically, in CA1 of the first pass, CA2 of the second pass, CA7 of the seventh pass, and CA8 of the eighth pass, all pixels are print-not-allowed pixel. In CA3 of the third pass, CA4 of the fourth pass, CA5 of the fifth pass, and CA6 of the sixth pass, print-allowed pixels are evenly allocated to the patterns of these four passes. Although the print-allowed pixels are evenly allocated from CA3 to CA6, there is not a limitation as such. For example, it is also possible that the printing rate for each pass is gradated such that the number of print-allowed pixels of CA4 and CA5 is larger than that of CA3 and CA6, etc.

=Generation Processing=

Figure 10:
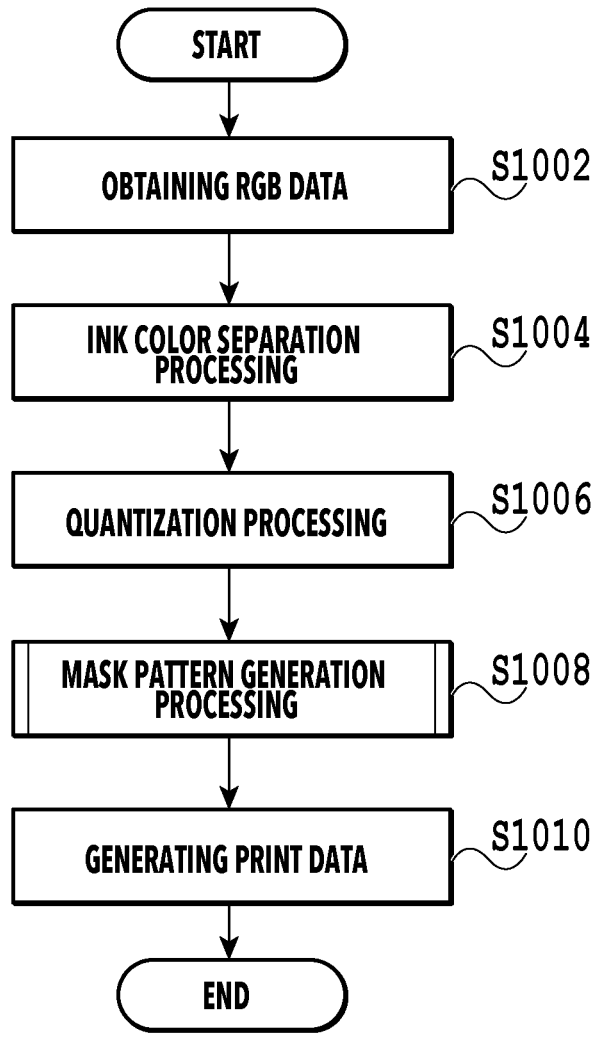
FIG. 10 is a flowchart of generation processing in the present embodiment.
Figure 11:
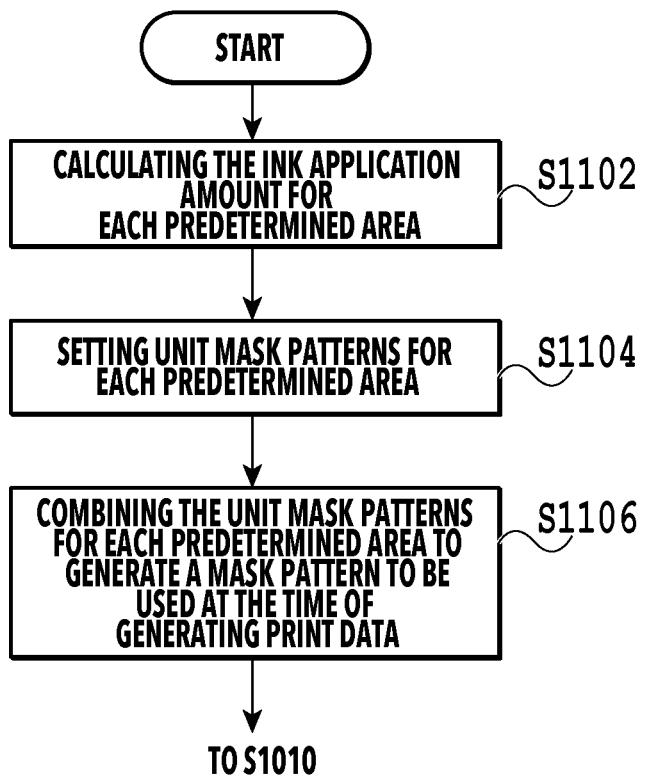
FIG. 11 is a flowchart of mask pattern generation processing which is a subroutine of the generation processing of FIG. 10.

Next, the generation processing for generating print data using the mask pattern RA, the mask pattern CA, and the mask pattern CB will be explained. Note that this generation processing is started based on, for example, an instruction from the user, etc. FIG. 10 is a flowchart illustrating the detailed processing routine of the generation processing for generating print data using the mask pattern RA, the mask pattern CA, and the mask pattern CB. FIG. 11 is a flowchart illustrating the detailed processing routine of mask pattern generation processing which is a subroutine of the generation processing of FIG. 10. The series of these processes illustrated in the flowcharts of FIG. 10 and FIG. 11 is performed by the CPU 402 loading a program code stored in the ROM 404 into the RAM 406 and executing the program code. Alternatively, a part or all of the functions in the steps of FIG. 10 and FIG. 11 may be executed by hardware such as another ASIC or an electronic circuit. Note that the sign "S" in the explanation of each process means that it is a step of the flowcharts. Note that the same applies to the following flowchart.

If the generation processing is started, the CPU 402 obtains RGB data (8 bits) that is input from an external device such as the host PC 18 (S1002). RGB data is input in advance as image data from an external device, and the input RGB data is stored in a storage area such as the RAM 406. Therefore, in S1002, the CPU 402 obtains RGB data saved in the storage area.

Next, the CPU 402 performs ink color separation processing on the obtained RGB data to separate the RGB data into image data (8 bits) for each of the CMYK inks and the reaction liquid Rct corresponding to the respective ejection port arrays 204 (S1004). A three-dimensional look-up table stored in the ROM 404 is used in the ink color separation processing of S1004.

Figure 12:
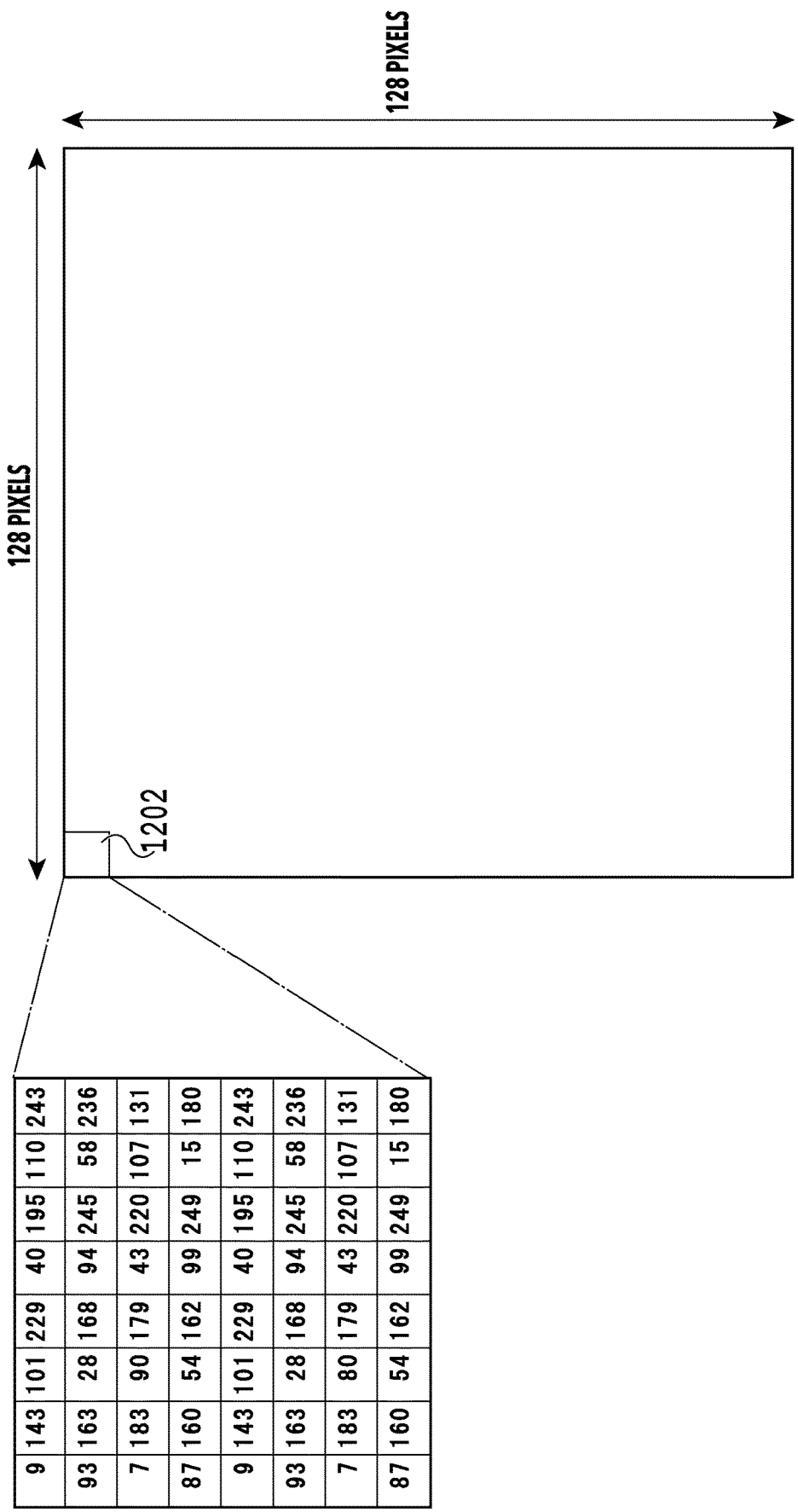
FIG. 12 is a diagram illustrating an example of a dither pattern.

Thereafter, the CPU 402 performs quantization processing on the image data obtained in S1004 (S1006). In S1006, the quantization processing is performed using a dither pattern stored in a storage area such as the ROM 404 to obtain binary image data indicating ejection or non-ejection of ink in each pixel. In the present embodiment, the dither pattern has a size of 128 pixels×128 pixels (see FIG. 12). FIG. 12 is a diagram illustrating an example of the dither pattern used in the present embodiment. In the dither pattern illustrated in FIG. 12, the partial area 1202 is enlarged to illustrate an example of the threshold values of the respective pixels in the area.

Upon obtaining the binary image data, the CPU 402 next performs mask pattern generation processing for generating mask patterns corresponding to the size of the binary image data (S1008). The mask pattern generation processing will be described later. Thereafter, the CPU 402 generates print data corresponding to each of the eight times of scanning (S1010) using the mask patterns (the later-described combined mask patterns) generated in the mask pattern generation processing of S1008. In S1010, for each of the inks and reaction liquid, print data representing ejection or non-ejection in each scanning at the time of performing printing in a unit area with eight times of scanning is generated.

—Mask Pattern Generation Processing

Figure 14A:
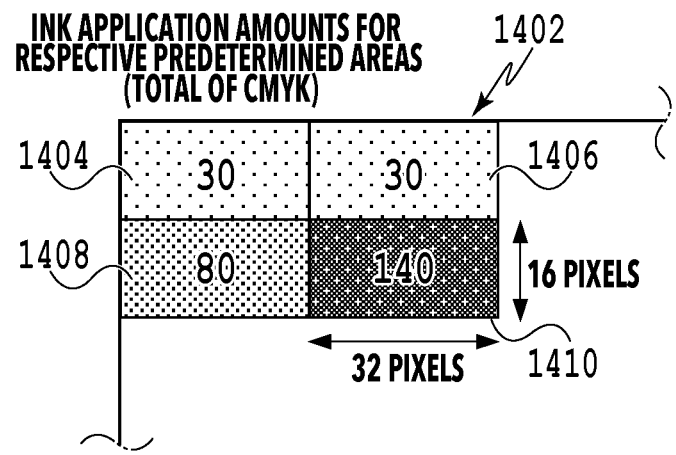
FIGS. 14A to 14C are diagrams for explaining a method of setting unit mask patterns for each predetermined area of binary image data.
Figure 14B:
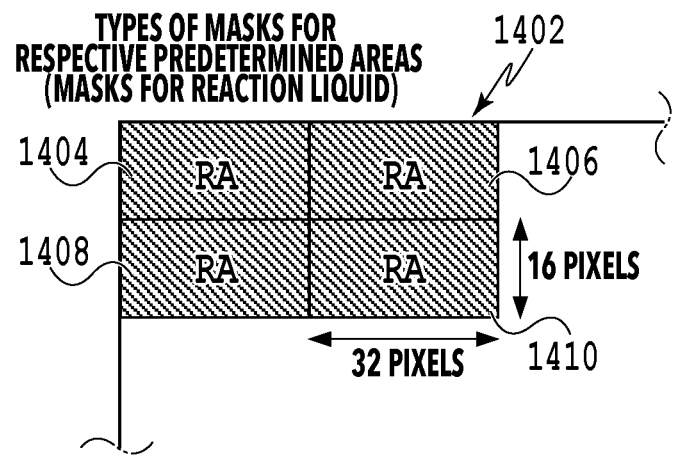
Figure 14C:
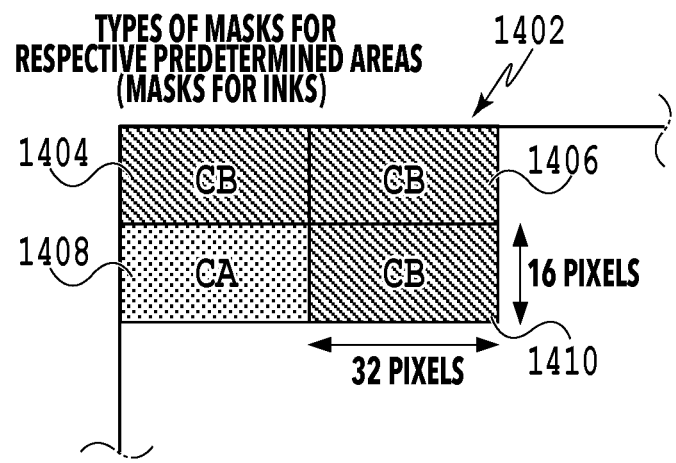

Here, the mask pattern generation processing of S1008 will be explained in detail with reference to FIG. 11, FIG. 13, FIG. 14A, FIG. 14B, FIG. 14C, FIG. 15A, FIG. 15B, FIG. 15C, FIG. 15D, and FIG. 15E. FIG. 13 is a diagram illustrating an example of a threshold value table for selecting unit mask patterns. FIG. 14A to FIG. 14C are diagrams for explaining a method of setting a unit mask pattern in each predetermined area in a partial area of binary image data. FIG. 15A to FIG. 15E are diagrams illustrating combined mask patterns generated for the partial area.

If the mask pattern generation processing is started, first, the CPU 402 divides the binary image data of the CMYK inks into predetermined areas, then counts the dots to be formed in each predetermined area, and then calculates the ink application amount for each predetermined area (S1102). In S1102, dot counting is performed on the binary image data of each of the C ink, M ink, Y ink, and K inks for each predetermined area, so that the ink application amount is calculated from the sum total of the count values of the respective inks. In the present embodiment, it is assumed that a predetermined area is 32 pixels×16 pixels. Further, an ink application amount is assumed to be image density (print duty). In this way, in the present embodiment, the control part 400 (CPU 402) functions as a calculation part that calculates an ink application amount.

Here, for ease of understanding, the explanation will be given focusing on the predetermined areas located in the partial area 1402 of 64 pixels×32 pixels in the binary image data obtained by the quantization processing (see FIG. 14A). The predetermined areas 1404, 1406, 1408, and 1410 are located in the partial area 1402. The ink application amounts Id (%) calculated in S1102 are "30%" for the predetermined area 1404, "30%" for the predetermined area 1406, "80%" for the predetermined area 1408, and "140%" for the predetermined area 1410.

Next, the CPU 402 sets unit mask patterns for the inks and reaction liquid for the respective predetermined areas, based on the threshold value table 1302 stored in the storage area such as the ROM 404 (S1104). In the threshold value table 1302, based on the ink application amount, the tone is sorted into low density tone, intermediate density tone, and high density tone, and unit mask patterns for the reaction liquid and inks are associated with the respective tone. Specifically, the ink application amount of less than 40%, which is determined as low density tone, and the ink application amount of 125% or more, which is determined as high density tone, are associated with the mask pattern CB as the unit mask pattern for the inks and associated with the mask pattern RA as the unit mask pattern for the reaction liquid. Further, the ink application amount of 40% or more and less than 125%, which is determined as intermediate density tone, is associated with the mask pattern CA as the unit mask pattern for the inks and associated with the mask pattern RA as the unit mask pattern for the reaction liquid.

In S1104, based on the ink application amount Id (%), the type of mask pattern is determined for each predetermined area with reference to the threshold value table. Therefore, in the case of the ink application amounts Id (%) illustrated in FIG. 14A, the mask pattern RA is set in each predetermined area as the pattern for the reaction liquid (see FIG. 14B). Further, as the patterns for the inks, in the predetermined area 1404 and predetermined area 1406 where the ink application amounts Id (%) are 30%, the ink application amounts Id (%) are less than 40%, and thus the mask pattern CB is set. In the predetermined area 1408 where the ink application amount Id (%) is 80, the ink application amount Id (%) is 40% or more and less than 125%, and thus the mask pattern CA is set. In the predetermined area 1410 where the ink application amount Id (%) is 140, the ink application amount Id (%) is 125% or more, and thus the mask pattern CB is set (see FIG. 14C).

Thereafter, the CPU 402 combines the unit mask patterns selected for each predetermined area to generate a combined mask pattern for the inks and reaction liquid to be used at the time of generating print data (S1106), which corresponds to the size of the binary image data, and the processing proceeds to S1010. In S1106, combined mask patterns for the respective passes, i.e., the combined mask patterns for the first pass to the eights pass, are respectively generated in the present embodiment. In the partial area 1402 illustrated in FIG. 14A to FIG. 14C, the combined mask patterns are as illustrated in FIG. 15A to FIG. 15E.

That is, regarding the combined mask patterns for the reaction liquid, as the mask pattern corresponding to the first pass, the mask pattern RA1 (see FIG. 15C) is applied to each predetermined area, and thus all pixels become print-allowed pixels. Further, as the mask patterns corresponding to the second to the eighth pass, the mask patterns RA1 to RA8 corresponding to the respective passes (see FIG. 15C) are applied, and thus all pixels become print-not-allowed pixels (see FIG. 15A).

Figures 15A, 15B:
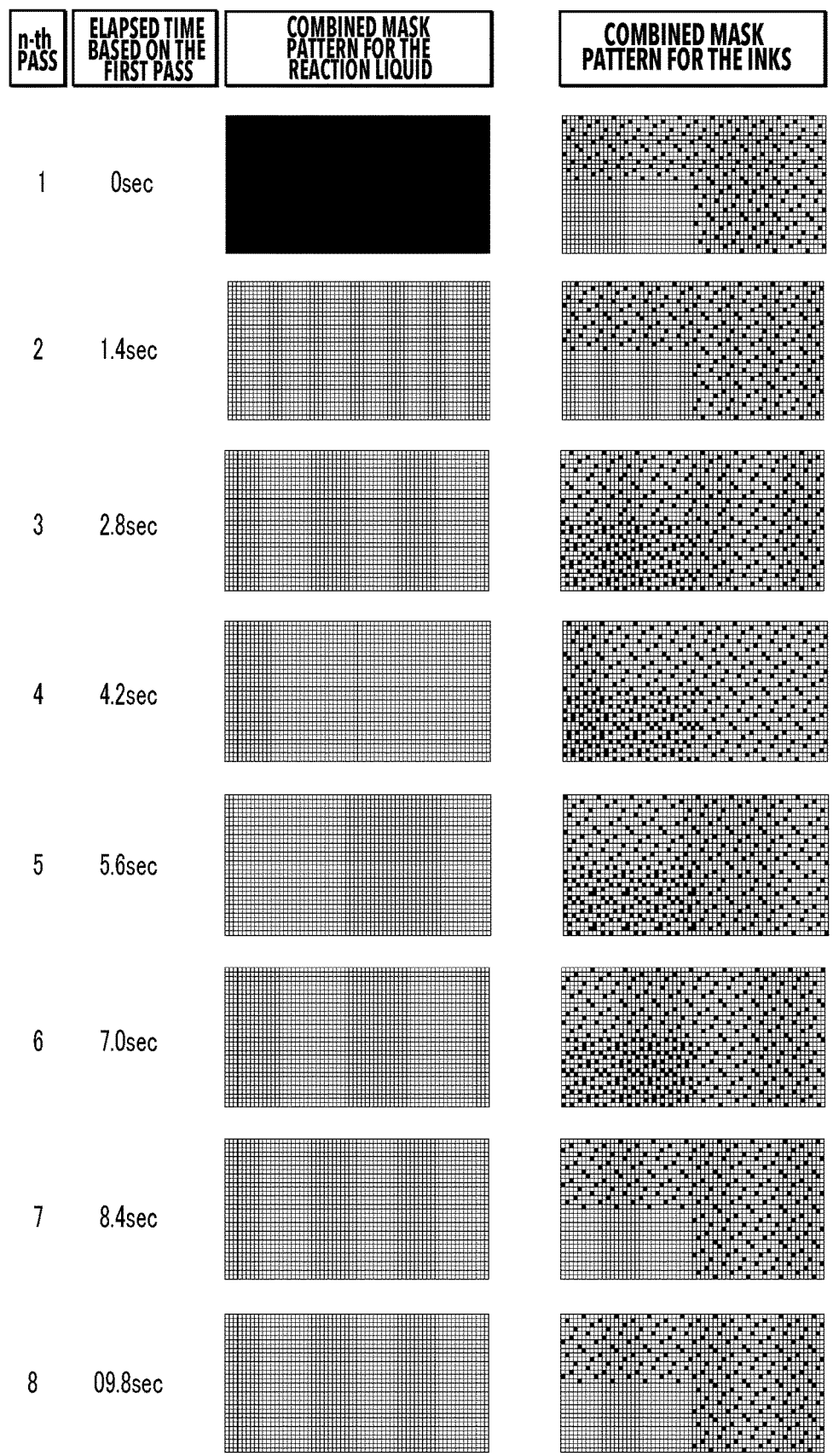

The combined mask patterns for the inks are as illustrated in FIG. 15B. That is, as the mask patterns corresponding to the first to eighth passes, respectively, the mask patterns CB1 to CB8 of the corresponding passes (see FIG. 15E) are applied to the predetermined areas 1404, 1406, and 1410. On the other hand, at positions corresponding to the predetermined area 1408, the mask patterns CA1 to CA8 of the corresponding passes (see FIG. 15D) are applied. Therefore, as the combined mask patterns corresponding to the first pass, the second pass, the seventh pass, and the eighth pass, patterns in which print-allowed pixels and print-not-allowed pixels coexist are used for the predetermined areas 1404, 1406, and 1410, and a pattern configured with print-not-allowed pixels is used for the predetermined area 1408. On the other hand, as the combined mask patterns corresponding to the third pass to the sixth pass, although patterns in which print-allowed pixels and print-not-allowed pixels coexist are used for the respective predetermined areas, more print-allowed pixels are formed in the predetermined area 1408 than in other predetermined areas.

In this way, in the present embodiment, the control part 400 (CPU 402) functions as a mask pattern generation part that generates mask patterns. The combined mask pattern for the reaction liquid thus obtained is used in S1010 to generate corresponding print data for the reaction liquid for each of the first to eighth passes. Further, the obtained combined mask patterns for the inks are used in S1010 to generate corresponding print data for an ink for each of the first to eighth passes of each ink. With the obtained print data, in the predetermined area 1408 of intermediate density tone where the ink application amount Id (%) is 40% or more and less than 125%, ink is ejected intensively in the third to sixth passes.

=Print Processing=

Upon obtaining print data corresponding to each scanning, the printing apparatus 10 performs printing on a print medium, based on the print data. Here, with the obtained print data, in the areas of intermediate density tone where a reduction in gloss image clarity is likely to occur, ink is ejected in the third to sixth passes which are carried out at the formation time T1 or later and earlier than the dissolution time T2 after the landing of the reaction liquid. Therefore, in the areas of intermediate density tone, after the reaction liquid ejected in the first pass lands on the print medium, the inks are ejected in a state where a reaction liquid film has been formed. Accordingly, the ink dots formed in the areas have a larger diameter and lower height than the ink dots formed in the areas of low density tone and high density tone. Accordingly, reduction in gloss image clarity is suppressed in the areas of intermediate density tone.

As explained above, in the printing apparatus 10, the control part 400 (CPU 402) generates a mask pattern to be used in generating print data for inks and a reaction liquid, based on binary image data obtained by image processing. As the mask patterns for the reaction liquid, the pattern in which the reaction liquid can be applied to all pixels is used in the first pass and the pattern in which the reaction liquid cannot be applied to all pixels is used in the second to eighth passes. On the other hand, for the inks, the printing rate is not biased in each pass in the areas of low density tone and high density tone. Further, in the areas of intermediate density tone, ink is applied in passes of which the elapsed time from the pass in which the reaction liquid is applied is the formation time T1 or longer and shorter than the dissolution time T2, and ink is not applied in the passes other than those passes.

Therefore, in the areas of intermediate density tone where reduction in gloss image clarity tends to occur, ink is ejected onto the reaction liquid film, and thus the formed ink dots have a large diameter and low dot height. Accordingly, the reduction in gloss image clarity that occurs in the areas is suppressed.

Second Embodiment

Next, with reference to FIG. 16A to FIG. 19, an explanation will be given of a printing apparatus including the image processing apparatus according to the second embodiment. Note that, in the following explanation, the same or corresponding configurations as those of the above-mentioned first embodiment are assigned with the same reference signs as those used in the first embodiment, so as to omit the detailed explanations thereof.

The second embodiment is different from the above-described first embodiment in the aspect that the ink application timing in the pixel areas of intermediate density tone is changed according to the type of print medium. Here, in the first embodiment, values for a typical print medium used in a printing apparatus are used for the formation time T1 and the dissolution time T2, which are parameters that serve as references for determining the ink application timing. However, on print media of different materials, manufacturing methods, surface treatments, etc., the wettability, i.e., the wetting and spreading characteristics of a reaction liquid is different, depending on the type of print medium. For this reason, the formation time T1 and the dissolution time T2 change on print media with different wetting and spreading characteristics of the reaction liquid. Therefore, in the present embodiment, the ink application timing is changed according to the type of print medium.

FIG. 16A to FIG. 16C are diagrams for explaining the wetting and spreading characteristics of the print medium A and the print medium B. FIG. 16A is a graph illustrating the wetting and spreading characteristics of the print medium A. FIG. 16B is a graph illustrating the wetting and spreading characteristics of the print medium B. FIG. 16C is a table illustrating the formation times T1 and dissolution times T2 of the respective print media. In FIG. 16A and FIG. 16B, the horizontal axis indicates the elapsed time after the landing of the reaction liquid, and the vertical axis indicates the degree of wetting and spreading of the reaction liquid. FIG. 17 is a diagram illustrating a unit mask pattern for the reaction liquid and unit mask patterns for the inks corresponding to the print medium B.

The print medium B is a print medium with lower wettability for the reaction liquid, i.e., a print medium with lower wetting and spreading characteristics, compared to the print medium A. Therefore, on the print medium B, the wetting and spreading speed of reaction liquid droplets after the landing of the reaction liquid is lower than the wetting and spreading speed of the reaction liquid droplets on the print medium A. Therefore, the formation time T1B (4.6 sec) on the print medium B is later than the formation time T1A (2.4 sec) on the print medium A. Further, the dissolution time T2 on the print medium B, which has low wetting and spreading characteristics, is earlier, and the dissolution time T2B (7.4 sec) on the print medium B is earlier than the dissolution time T2A (8.0 sec) on the print medium A.

The unit mask pattern for the reaction liquid and the unit mask patterns for the inks associated with the print medium A are as illustrated in FIG. 9, as with the above-described first embodiment. Specifically, the mask pattern CA is a mask pattern in which print-allowed pixels are formed only in the third to sixth passes in which the elapsed time with reference to the first pass is 2.4 sec or longer and shorter than 8.0 sec. That is, print-allowed pixels for all pixels are allocated to the four passes, i.e., the third to sixth passes. Further, in the first, second, seventh, and eighth passes, the mask pattern in which only print-not-allowed pixels are formed is used.

On the other hand, the unit mask pattern for the reaction liquid and the unit mask patterns for the inks associated with the print medium B are as illustrated in FIG. 17. Specifically, the mask pattern CC for the inks which is used in the pixel areas of intermediate density tone is a mask pattern in which print-allowed pixels are formed only in the fifth and sixth passes in which the elapsed time with reference to the first pass is 4.6 sec or longer and shorter than 7.4 sec. That is, print-allowed pixels for all pixels are allocated to the two passes, i.e., the fifth and sixth passes. Further, in the first to fourth, seventh, and eighth passes, the mask pattern in which only print-not-allowed pixels are formed is used. Note that the mask pattern RA and the mask pattern CB are the same patterns on both print medium A and print medium B.

In this way, in the present embodiment, a set of unit mask patterns for the reaction liquid and inks (hereinafter referred to as a "mask set") as illustrated in FIG. 9 and FIG. 17 is stored in a storage area such as the ROM 404 for each type of print medium. In the present embodiment, a mask set is selected based on information related to the print medium, with which the type of print medium can be determined. The information related to the print medium is input by the user before printing, together with information necessary for the printing such as the print mode and number of printing sheets, for example. The input information for printing is stored in a storage area such as the RAM 406, for example.

=Mask Pattern Generation Processing=

Figure 18:
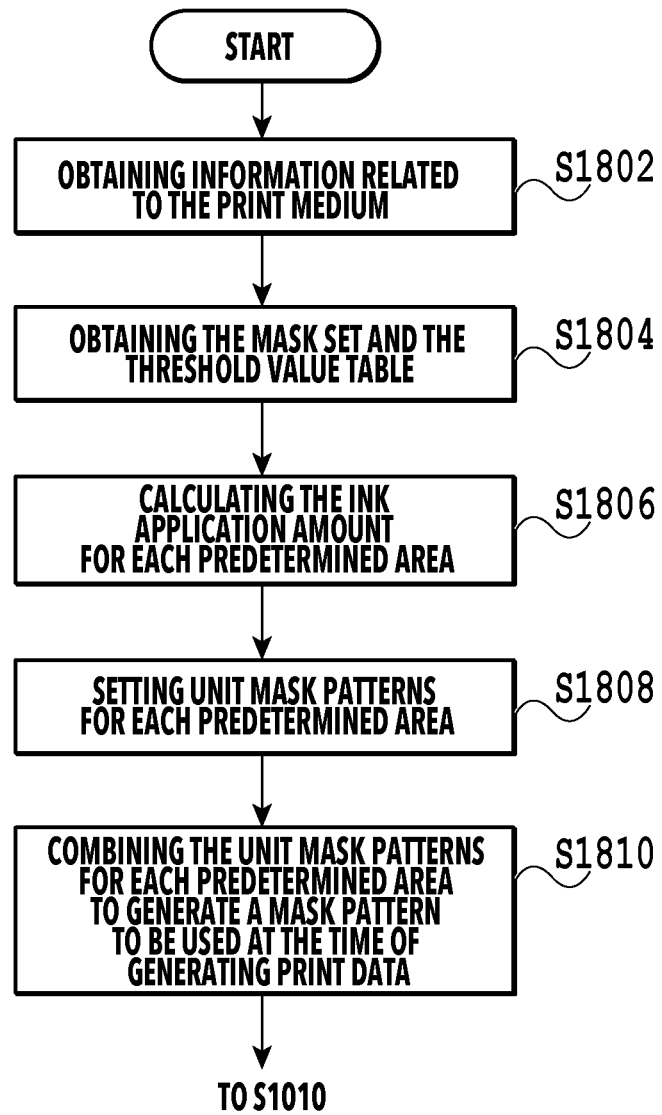
FIG. 18 is a flowchart of mask pattern generation processing in another embodiment.

Further, in the mask pattern generation processing, the unit mask pattern for the reaction liquid and the unit mask patterns for the inks associated with the type of print medium are used to generate mask patterns to be used for generating print data. FIG. 18 is a flowchart illustrating the detailed processing routine of the mask pattern generation processing of the present embodiment, which is a subroutine of the generation processing of FIG. 10. FIG. 19 is a diagram illustrating an example of a threshold value table used in the present embodiment.

If the mask pattern generation processing of FIG. 18 is started, the CPU 402 first obtains information related to the print medium to be used for the printing (S1802). Next, the CPU 402 obtains the mask set corresponding to the obtained information related to the print medium and the threshold value table 1902 for selecting mask patterns from the mask set (S1804). Therefore, if the information related to the print medium A is obtained in S1802, the mask set configured with the mask pattern RA, mask pattern CA, and mask pattern CB as illustrated in FIG. 9 is obtained together with the threshold value table 1902 in S1804. Further, if the information related to the print medium B is obtained in S1802, the mask set configured with the mask pattern RA, mask pattern CC, and mask pattern CB as illustrated in FIG. 17 is obtained together with the threshold value table 1902 in S1804.

In the threshold value table 1902, based on the ink application amounts for each type of print medium, the tone is sorted into low density tone, intermediate density tone, and high density tone, and unit mask patterns for the reaction liquid and inks are associated with the respective tone. In the threshold value table 1902, the ink application amounts Id (%) for the respective tone are the same as in the threshold value table 1302. Specifically, in the threshold value table 1902, any one of the mask pattern RA, the mask pattern CA, and the mask pattern CB is associated with the unit mask patterns for the reaction liquid and inks of the respective tone for the print medium A. Further, any one of the mask pattern RA, the mask pattern CC, and the mask pattern CB is associated with the unit mask patterns for the reaction liquid and inks of the respective tone for the print medium B.

Thereafter, the CPU 402 divides the binary image data of the respective CMYK inks into predetermined areas, then counts the dots formed in each predetermined area, and then calculates the ink application amount for each predetermined area (S1806). Since the specific processing content of S1806 is the same as the process of S1102 described above, the explanation thereof will be omitted.

Further, the CPU 402 sets unit mask patterns for the inks and reaction liquid for the respective predetermined areas, based on the threshold value table 1902 and mask set obtained in S1804 (S1808). In S1808, the type of print medium is determined from the information related to the print medium. Then, based on the ink application amounts Id (%) obtained in S1806 for the respective predetermined areas, the unit mask patterns are determined by referring to the information corresponding to the determined type of print medium in the threshold value table 1902. Note that the specific method of determining unit mask patterns based on the ink application amounts Id (%) with reference to the information in a threshold value table is the same as in S1104 described above.

Thereafter, the CPU 402 combines the unit mask patterns selected for each predetermined area to generate combined mask patterns for the inks and reaction liquid to be used at the time of generating print data (S1810), which corresponds to the size of the binary image data, and the processing proceeds to S1010. Since the specific processing content of S1810 is the same as that of S1106 described above, the detailed explanation thereof will be omitted.

Upon obtaining the print data for each scanning, the printing apparatus 10 performs printing on a print medium based on the print data. Here, with the obtained print data, in the areas of intermediate density tone where a reduction in gloss image clarity is likely to occur, ink is ejected in the passes which are carried out at the formation time T1 or later, which is according to the wetting and spreading characteristics of the print medium, and earlier than the dissolution time T2, which is according to those characteristics, after the landing of the reaction liquid. Therefore, in the areas of intermediate density tone, ink is ejected in a state where the reaction liquid film has been formed on the print medium, regardless of the type of print medium. Accordingly, compared to the above-described first embodiment, it is possible to more reliably suppress a reduction in gloss image clarity in an area of intermediate density tone.

As explained above, in the printing apparatus 10 according to the present embodiment, in addition to the configuration of the first embodiment, the ink application timing is changed according to the type of print medium to be used for printing. Specifically, a mask set corresponding to the wetting and spreading characteristics of a reaction liquid is stored for each type of print medium to be used. Further, by use of the threshold value table 1902, the mask patterns in the mask set is utilized to generate mask patterns for applying ink in a state where a reaction liquid film is formed in an area of intermediate density tone. Therefore, according to the type of print medium, it is possible to suppress a reduction in gloss image clarity in an area of intermediate density tone where a reduction in gloss image clarity is likely to occur.

Other Embodiments

Note that the above-described embodiments may be modified as shown in the following (1) through (5).

(1) Although not specifically described in the above embodiments, there is not such a limitation that the control part 400 (CPU 402) of the printing apparatus 10 performs image processing on input image data to generate print data. That is, it is also possible that the control part 400 generates print data for inks and print data for a reaction liquid for binary image data generated by an external device. Further, it is also possible that the image processing for generating print data from image data or binary image data is executed by various kinds of external devices such as the host PC 18. In this case, the external device that performs the image processing functions as the image processing apparatus.

(2) In the above-described embodiments, although the reaction liquid is applied in one pass, there is not a limitation as such. Specifically, it is also possible that the reaction liquid is applied in multiple passes as long as the wetting and spreading of the reaction liquid on the print medium can be sufficiently controlled. Further, it is also possible that the number of passes for applying a reaction liquid is different between intermediate density tone and high density tone and low density tone.

In a case where the reaction liquid is applied in multiple passes, for example, with reference to the time at which the reaction liquid is applied in the first pass, the elapsed time from the reference time is calculated. Further, a mask pattern in which ink is not applied is generated for passes of which the elapsed time is shorter than the formation time T1 and passes of which the elapsed time is longer than the dissolution time T2. Further, mask patterns in which ink is applied is generated for passes of which the elapsed time is equal to or longer than the formation time T1 or equal to or shorter than the dissolution time T2.

(3) Although the ink application amount Id (%) in a predetermined area is obtained based on binary image data of each ink obtained in the quantization processing, there is not a limitation as such. Specifically, it is sufficient if an approximate ink application amount for judging the tone can be obtained, and it is also possible that the approximate ink application amount Id (%) in a predetermined area is obtained based on RGB data, CMYK data after ink color separation processing, etc., for example.

(4) In the above-described embodiment, although the printing apparatus 10 applies the reaction liquid during printing, it is also possible that printing without application of a reaction liquid can be executed depending on the characteristic (permeability) of the print medium, for example. In this case, for example, the mask pattern CB is used as the mask pattern for inks. Further, although a unit area is printed in eight passes in the printing apparatus 10, there is not a limitation as such. Specifically, it is also possible that the printing on a unit area is performed in multiple passes other than eight passes (5) The above-mentioned embodiments and the above-mentioned various kinds of form illustrated in (1) through (4) may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-182861, filed Nov. 9, 2021, which is hereby incorporated by reference herein in its entirety.

What is claimed is:

1. An image processing apparatus comprising:
a printing unit configured to eject an ink and a reaction liquid that prompts thickening of the ink;
a conveyance unit configured to convey a print medium, wherein a multi-pass printing is performed in which (1) a printing scan of the printing unit while ejecting the ink and the reaction liquid and (2) a conveyance operation of the conveyance unit conveying the print medium in a direction crossing a direction of the printing scan are executed alternately, to complete an image in a unit area of the print medium by a plurality of passes of the printing unit;
an obtainment unit configured to obtain image data;
a holding unit configured to hold a plurality of unit mask patterns usable in the printing scan; and
a generation unit configured to process the image data to generate print data for applying the ink and the reaction liquid to the print medium such that the print data corresponds to respective passes of the multi-pass printing,
wherein the generation unit generates print data for the ink by determining appropriate mask patterns from the plurality of unit mask patterns such that the ink is applied to the unit area only in a pass of which an elapsed time after application of the reaction liquid to the print medium is equal to or longer than a first time and shorter than a second time, wherein the first time is from a timing where the reaction liquid is applied to the print medium up to a timing where adjacent droplets of the applied reaction liquid come into contact with each other and coalesce to form a reaction liquid film, and wherein the second time is from the timing where the reaction liquid is applied to the print medium up to a timing where the formed reaction liquid film is dissolved.

2. The image processing apparatus according to claim 1, wherein the first time and the second time differ according to wetting and spreading characteristics of the reaction liquid in relation to the print medium.

3. The image processing apparatus according to claim 1, wherein the holding unit holds the unit mask patterns corresponding to respective types of print medium, and wherein the mask pattern generation unit generates the combined mask pattern by use of the unit mask patterns according to the type of print medium to be a target of printing with the print data for the ink which is generated by the generation unit.

4. The image processing apparatus according to claim 1, further comprising:

a calculation unit configured to calculate ink application amounts of respective second areas which are included in a first area in the image data; and a mask pattern generation unit configured to generate a combined mask pattern for the ink corresponding to the image data by determining mask patterns for the respective second areas by use of the unit mask patterns, based on the ink application amounts, and combining the mask patterns that are set for the second areas, wherein, as patterns for the ink, the unit mask patterns include (1) a first mask pattern which includes a pattern in which print-allowed pixels are allocated for all pixels and which is provided for a pass corresponding to the first time or later and earlier than the second time and a pattern in which only print-not-allowed pixels are formed and which is provided for the passes other than that pass and (2) a second mask pattern in which print-allowed pixels are allocated for all pixels in a pattern for each pass, wherein, based on the ink application amounts, the mask pattern generation unit (1) uses the first mask pattern as the unit mask pattern in a case where the second area is an area of intermediate density tone and (2) uses the second mask pattern as the unit mask pattern in a case where the second area is an area of tone other than the intermediate density tone, and wherein the generation unit applies the combined mask pattern for the ink to respective passes to generate the print data for the ink corresponding to the respective passes for binary image data which is obtained by processing the image data.

5. The image processing apparatus according to claim 4, wherein, as a pattern for the reaction liquid, the unit mask patterns further include a third mask pattern which includes a pattern provided for a first pass in which all pixels are print-allowed pixels and a pattern provided for another pass in which all pixels are print-not-allowed pixels, wherein the mask pattern generation unit generates a combined mask pattern for the reaction liquid by using the third mask pattern as the unit mask patterns, regardless of the ink application amounts, and wherein the generation unit applies the combined mask pattern for the reaction liquid to the respective passes to generate the print data for the reaction liquid corresponding to the respective passes for the binary image data.

6. The image processing apparatus according to claim 3, wherein, in the pattern of the first mask pattern provided for the pass corresponding to the first time or later and earlier than the second time, the print-allowed pixels are formed such that a print rate in the pass is even.

7. The image processing apparatus according to claim 1, wherein the generation unit generates the print data for the ink for an area of intermediate density tone in binary image data which is obtained by processing the image data.

8. The image processing apparatus according to claim 7, wherein a print duty of the intermediate density tone is 40% or more and less than 125%.

9. The image processing apparatus according to claim 1, wherein the print medium on which the ink and the reaction liquid are applied is a print medium with low ink permeability or no ink permeability.

10. The image processing apparatus according to claim 9, wherein, on the print medium to which the ink and the reaction liquid are applied, a transfer amount per a transfer time of 1 second relative to a determinate quantity of ink measured in Bristow's method is a value smaller than 20 ml/m2.

11. An image processing method for processing image data, the image processing method comprising:

obtaining image data;

determining a plurality of unit mask patterns to be used in a multi-pass printing;

generating print data for applying an ink and a reaction liquid that prompts thickening of the ink to a print medium corresponding to each pass of the multi-pass printing by processing the image data obtained in the obtaining step using the plurality of the unit mask patterns determined in the determining; and performing the multi-pass printing based on the print data generated in the generating, in which (1) a printing scan of a printing unit while ejecting the ink and the reaction liquid and (2) a conveyance operation of the print medium in a direction crossing a direction of the printing scan are executed alternately, to complete an image in a unit area of the print medium by a plurality of passes of the printing unit, wherein, in the determining, appropriate unit mask patterns are determined from the plurality of unit mask patterns such that the ink is applied to the unit area only in a pass of which an elapsed time after application of the reaction liquid to the print medium is equal to or longer than a first time and shorter than a second time, in the multi-pass printing, wherein the first time is from a timing where the reaction liquid is applied to the print medium up to a timing where adjacent droplets of the applied reaction liquid come into contact with each other and coalesce to form a reaction liquid film, and wherein the second time is from the timing where the reaction liquid is applied to the print medium up to a timing where the formed reaction liquid film is dissolved.

12. A non-transitory computer-readable storage medium storing a program for causing a computer to function as an image processing apparatus, the image processing apparatus comprising:

a printing unit configured to eject an ink and a reaction liquid that prompts thickening of the ink;

a conveyance unit configured to convey a print medium, wherein a multi-pass printing is performed in which (1) a printing scan of the printing unit while ejecting the ink and the reaction liquid and (2) a conveyance operation of the conveyance unit conveying the print medium in a direction crossing a direction of the printing scan are executed alternately, to complete an image in a unit area of the print medium by a plurality of passes of the printing unit;

an obtainment unit configured to obtain image data;

a holding unit configured to hold a plurality of unit mask patterns usable in the printing scan; and a generation unit configured to process the image data to generate print data for applying the ink and the reaction liquid to the print medium such that the print data corresponds to respective passes of the multi-pass printing, wherein the generation unit generates the print data for the ink by determining appropriate mask patterns from the plurality of unit mask patterns such that the ink is applied to the unit area only in a pass of which an elapsed time after application of the reaction liquid to the print medium is equal to or longer than a first time and shorter than a second time, wherein the first time is from a timing where the reaction liquid is applied to the print medium up to a timing where adjacent droplets of the applied reaction liquid come into contact with each other and coalesce to form a reaction liquid film, and wherein the second time is from the timing where the reaction liquid is applied to the print medium up to a timing where the formed reaction liquid film is dissolved.

* * * * *